United States Patent
Didey et al.

(10) Patent No.: US 10,676,178 B2
(45) Date of Patent: Jun. 9, 2020

(54) LANDING GEAR DRIVE SYSTEM FLEXIBLE INTERFACE

(71) Applicant: AIRBUS OPERATIONS LIMITED, Bristol (GB)

(72) Inventors: Arnaud Didey, Bristol (GB); Fraser Wilson, Bristol (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 229 days.

(21) Appl. No.: 14/916,579

(22) PCT Filed: Sep. 5, 2014

(86) PCT No.: PCT/GB2014/052701
§ 371 (c)(1),
(2) Date: Mar. 4, 2016

(87) PCT Pub. No.: WO2015/033160
PCT Pub. Date: Mar. 12, 2015

(65) Prior Publication Data
US 2016/0214707 A1    Jul. 28, 2016

(30) Foreign Application Priority Data

Sep. 5, 2013    (GB) .................................. 1315802.7
Mar. 17, 2014   (GB) .................................. 1404715.3
Jun. 5, 2014    (GB) .................................. 1410034.1

(51) Int. Cl.
*B64C 25/40*    (2006.01)
*F16D 3/06*     (2006.01)
(Continued)

(52) U.S. Cl.
CPC ............ *B64C 25/405* (2013.01); *F16D 3/065* (2013.01); *F16D 3/185* (2013.01); *F16D 3/223* (2013.01); *Y02T 50/823* (2013.01)

(58) Field of Classification Search
CPC .......... F16D 3/065; F16D 3/185; F16D 3/223; F16D 2003/22309; F16H 57/0025;
(Continued)

(56) References Cited

U.S. PATENT DOCUMENTS 2,453,279 A    11/1948 Starbuck
2,578,764 A    12/1951 Trbojevich
(Continued)

FOREIGN PATENT DOCUMENTS

DE    2103190 A1    8/1971
DE    3020544       12/1981
(Continued)

OTHER PUBLICATIONS

International Search Report and Written Opinion issued in Application No. PCT/GB2014/052701, dated Jan. 7, 2015.
(Continued)

*Primary Examiner* — Bobby Rushing, Jr.
(74) *Attorney, Agent, or Firm* — Nixon & Vanderhye P.C.

(57) ABSTRACT

A drive system for an aircraft landing gear, the drive system comprising: a pinion gear; a drive shaft arranged to rotate the pinion gear about a drive axis; a driven gear arranged to mesh with the pinion gear to be rotatable by the pinion gear, the driven gear being connectable to a wheel of the landing gear to be capable of rotating the wheel about a wheel axis; and a flexible interface comprising a crowned spline joint between the drive shaft and the pinion gear. The crowned spline joint is arranged to permit tilting of the pinion gear relative to the drive axis. In some embodiments a first spline joint between the drive shaft and the pinion gear is arranged to permit tilting of the pinion gear relative to the drive axis; and a second spline joint is arranged to permit translation of the pinion gear along the drive axis relative to the drive shaft.

27 Claims, 18 Drawing Sheets

(51) Int. Cl.
*F16D 3/18* (2006.01)
*F16D 3/223* (2011.01)

(58) Field of Classification Search
CPC ......... F16H 1/26; F16H 35/008; B64C 25/40; B64C 25/405; B60B 27/0021; B60B 35/127; B60B 35/128
USPC ......... 301/6.2, 6.5; 464/139–146; 244/104 R
See application file for complete search history.

(56) References Cited

U.S. PATENT DOCUMENTS

| | | | |
|---|---|---|---|
| 2,687,857 A | 8/1954 | Caldwell et al. | |
| 2,963,103 A | 12/1960 | Wood, Jr. et al. | |
| 3,070,979 A * | 1/1963 | Shipley | F16D 3/185 464/154 |
| 3,079,680 A | 3/1963 | Dier et al. | |
| 3,204,429 A | 9/1965 | Kayser | |
| 3,292,390 A | 12/1966 | Wildhaber | |
| 3,490,306 A | 1/1970 | Haensgen et al. | |
| 3,845,670 A | 11/1974 | Grayson | |
| 4,012,925 A | 3/1977 | Krude | |
| 4,335,963 A | 6/1982 | Jameson et al. | |
| 4,432,741 A | 2/1984 | Winkler | |
| 4,453,830 A | 6/1984 | Jameson et al. | |
| 4,464,141 A | 8/1984 | Brown | |
| 4,994,005 A | 2/1991 | Rennerfelt | |
| 5,393,267 A * | 2/1995 | Munyon | F16D 3/185 464/156 |
| 5,466,198 A | 11/1995 | McKibbin et al. | |
| 5,647,801 A | 7/1997 | Jacob | |
| 5,911,286 A | 6/1999 | Boutin | |
| 6,241,617 B1 * | 6/2001 | Jacob | B60K 17/22 464/167 |
| 6,261,184 B1 * | 7/2001 | Jacob | F16D 3/224 464/145 |
| 6,443,844 B1 * | 9/2002 | Perrow | F16D 3/065 464/145 |
| 6,871,719 B2 | 3/2005 | Breese et al. | |
| 7,281,984 B2 * | 10/2007 | Foster-Hamilton | F16D 3/065 277/634 |
| 7,578,215 B2 | 6/2009 | Knagge | |
| 8,052,345 B2 | 11/2011 | Byers et al. | |
| 8,342,970 B2 | 1/2013 | Altimas et al. | |
| 8,444,086 B2 | 5/2013 | Bucheton et al. | |
| 8,960,689 B1 | 2/2015 | Williams | |
| 9,506,501 B2 * | 11/2016 | Govert | F16D 3/24 |
| 2004/0231910 A1 * | 11/2004 | Mercier | B62M 17/00 180/383 |
| 2005/0005726 A1 | 1/2005 | Knagge | |
| 2005/0111907 A1 | 5/2005 | Urbach | |
| 2005/0119055 A1 | 6/2005 | Tokuoka et al. | |
| 2005/0196227 A1 | 9/2005 | Mahy et al. | |
| 2005/0215330 A1 | 9/2005 | Foster-Hamilton et al. | |
| 2006/0065779 A1 | 3/2006 | McCoskey et al. | |
| 2006/0226621 A1 | 10/2006 | Byers et al. | |
| 2008/0152424 A1 | 6/2008 | Igarashi et al. | |
| 2010/0087260 A1 | 4/2010 | Maki et al. | |
| 2011/0053726 A1 * | 3/2011 | Thompson | B62D 11/16 475/207 |
| 2012/0217340 A1 | 8/2012 | Essinger et al. | |
| 2012/0228921 A1 | 9/2012 | Essinger et al. | |
| 2012/0305702 A1 | 12/2012 | Bucheton et al. | |
| 2013/0002339 A1 | 1/2013 | Paul et al. | |
| 2013/0026284 A1 | 1/2013 | Christensen et al. | |
| 2013/0252748 A1 | 9/2013 | Sugiyama et al. | |
| 2014/0011625 A1 * | 1/2014 | Thompson | B60K 17/043 475/225 |
| 2014/0158820 A1 | 6/2014 | Wilson et al. | |
| 2014/0225421 A1 | 8/2014 | Oswald et al. | |
| 2014/0245853 A1 | 9/2014 | Didey | |
| 2014/0356027 A1 * | 12/2014 | Yamazaki | G03G 15/757 399/167 |
| 2015/0210385 A1 | 7/2015 | Didey | |
| 2015/0337891 A1 | 11/2015 | Mano | |
| 2016/0195167 A1 | 7/2016 | Hofmann | |

FOREIGN PATENT DOCUMENTS

| | | | |
|---|---|---|---|
| DE | 4328477 C2 * | 8/2000 | ............ F16D 3/185 |
| EP | 2524816 | 11/2012 | |
| EP | 2551192 | 1/2013 | |
| FR | 474613 | 3/1915 | |
| GB | 390438 * | 4/1933 | ............ F16D 3/224 |
| GB | 556203 | 9/1943 | |
| GB | 2080491 A | 2/1982 | |
| GB | 2152173 | 7/1985 | |
| JP | 1938001641 | 2/1938 | |
| JP | 4516 Y1 | 1/1970 | |
| JP | 5757923 | 4/1982 | |
| JP | 58190117 | 11/1983 | |
| JP | H0882326 | 3/1996 | |
| JP | 08511605 | 12/1996 | |
| JP | 2002323059 | 11/2002 | |
| JP | 2002364735 | 12/2002 | |
| JP | 2005054962 | 3/2005 | |
| JP | 2005163804 | 6/2005 | |
| JP | 2005241008 | 9/2005 | |
| JP | 2005249159 | 9/2005 | |
| JP | 2011131822 | 7/2011 | |
| JP | 2011131878 | 7/2011 | |
| JP | 2011236976 | 11/2011 | |
| JP | 5059656 | 8/2012 | |
| JP | 2012219960 | 11/2012 | |
| JP | 2013503070 | 1/2013 | |
| JP | 2013514228 | 4/2013 | |
| JP | 2013514229 | 4/2013 | |
| JP | 57057923 | 6/2015 | |
| WO | 3805509 | 7/1988 | |
| WO | 3146605 | 6/2001 | |
| WO | 2005098253 A1 | 10/2005 | |
| WO | 2011023505 A2 | 3/2011 | |
| WO | 2011073587 A1 | 6/2011 | |
| WO | 2011073590 A1 | 6/2011 | |
| WO | 2012171589 A1 | 12/2012 | |
| WO | 2014023939 A1 | 2/2014 | |
| WO | 2014023941 A1 | 2/2014 | |

OTHER PUBLICATIONS

Photograph of Crown Gears (website http://www.atlasgear.com/products/crown-gears.php); dates between Mar. 24, 2013 and Aug. 5, 2015 (dates for web link obtained from Internet Archive https://archive.org/web/).

Photograph of Splines (webiste http://www.atlasgear.com/products/splines.php); dates between Mar. 24, 2013 and Aug. 22, 2015 (dates for web link obtained from Internet Archive https://archive.org/web/).

English Translation of Notification of Reasons for Refusal for Japanese Application No. 2016-539637, four pages, dated Jul. 24, 2018.

International Search Report and Written Opinion issued in Application No. PCT/GB2014/052653, dated Jan. 7, 2015.

* cited by examiner

LANDING GEAR DRIVE SYSTEM FLEXIBLE INTERFACE

RELATED APPLICATIONS

The present application is a National Phase of International Application Number PCT/GB2014/052701, filed Sep. 5, 2014, which claims priority from Great Britain Application Numbers GB 1315802.7, filed Sep. 5, 2013, GB 1404715.3, filed Mar. 17, 2014, and GB 1410034.1, filed Jun. 5, 2014.

FIELD OF THE INVENTION

The present invention relates to a flexible interface between an aircraft landing gear wheel and a drive system for rotating that wheel for the purposes of ground taxiing.

BACKGROUND OF THE INVENTION

Aircraft are required to ground taxi between locations on airfields. An example is taxiing between a runway and the location (e.g. terminal gate) at which the aircraft's passengers are to board or disembark. Typically, such taxiing is achieved by using the thrust from the aircraft's engines to propel the aircraft forwards so that the landing gear wheels are caused to rotate. Since ground taxi speeds are necessarily relatively low, the engines must be run at a very low power. This means that there is a relatively high fuel consumption as a result of the poor propulsion efficiency at this low power. This leads to an increased level of both atmospheric and noise pollution locally around airports. Moreover, even when the engines are run at low power it is generally necessary to apply the wheel brakes to limit ground taxi speeds, leading to a high degree of brake wear.

Reversing of a civil aircraft, e.g. away from a terminal gate, using its main engines is not permitted. When reversing is necessary, or in other situations where ground taxiing via main engine thrust is not practicable, tow trucks are used to manoeuvre aircraft around. This process is laborious and costly.

There is therefore a need for a drive system to power the wheels of an aircraft landing gear during ground taxi operations.

Several autonomous ground taxi systems for both driving the wheels while the aircraft is on the ground and spinning them up prior to landing have been proposed in recent years. An example is disclosed in US2006/0065779, which proposes a powered nose aircraft wheel system in which a clutch is used to switch between a mode in which the wheel can spin freely and a mode in which the wheel can be driven by an electric motor. The clutch can also operate to enable the motor to pre-spin the wheel prior to landing.

A prior art arrangement which is not restricted to nose landing gears is described in WO2011/023505. The disclosed system uses an actuator to move a driven toothed pinion gear in and out of driving engagement with a toothed ring gear on the wheel.

SUMMARY OF THE INVENTION

A first aspect of the invention provides a drive system for an aircraft landing gear, the drive system comprising: a pinion gear; a drive shaft arranged to rotate the pinion gear about a drive axis; a driven gear arranged to mesh with the pinion gear to be rotatable by the pinion gear, the driven gear being connectable to a wheel of the landing gear to be capable of rotating the wheel about a wheel axis; and a flexible interface comprising a crowned spline joint between the drive shaft and the pinion gear to permit tilting of the pinion gear relative to the drive axis.

The present invention provides a solution to the problem of deformation of the landing gear during use. The flexible interface couples the drive shaft to the pinion gear, and comprises a crowned spline joint arranged to permit relative tilting between the pinion gear and driven gear. This crowned spline joint enables the flexible interface to accommodate tilting of the driven gear relative to the wheel caused by wheel axle deflections.

Preferably the crowned spline joint is also arranged to permit translation of the pinion gear along the drive axis. For instance the crowned spline joint may be slidably mounted on the drive shaft to permit relative translation between the pinion gear and the drive shaft. Typically the crowned spline joint comprises a coupling member which is slidably mounted on the drive shaft to permit relative translation between the pinion gear and the drive shaft along the drive axis.

The flexible interface may only be arranged to permit tilting of the pinion gear relative to the drive axis, but preferably it is also arranged to permit relative translation between the pinion gear and the drive shaft along the drive axis. The pinion gear may be slidably mounted on the drive shaft (optionally via a coupling member) to permit this relative translation, or the pinion gear may be mounted on the drive shaft (optionally via a coupling member) by a ball spline joint which permits this relative translation.

Optionally a pair of springs provide opposed forces which bias the pinion gear towards a central position along the drive axis. The springs may be coil springs, diaphragm springs, or petal springs for example.

The flexible interface may consist only of the crowned spline joint, but more typically it further comprises a second spline joint arranged to permit translation of the pinion gear along the drive axis relative to the drive shaft. The second spline joint may be between the crowned spline joint and the drive shaft, or between the crowned spline joint and the pinion gear.

Typically the second spline joint comprises a plurality of splines received within a corresponding plurality of grooves, and the splines can translate along the grooves (or vice versa) permit translation of the pinion gear along the drive axis relative to the drive shaft.

In one embodiment the crowned spline joint comprises a plurality of external splines received within a corresponding plurality of internal grooves in the pinion gear, the internal grooves can tilt relative to the external splines to permit tilting of the pinion gear relative to the drive axis, the second spline joint comprises a plurality of internal splines received within a corresponding plurality of external grooves in the drive shaft, and the internal splines can translate along the external grooves to permit translation of the pinion gear along the drive axis relative to the drive shaft. The external splines and internal splines may be formed in a single coupling member which transmits torque from the drive shaft to the pinion gear.

In one embodiment the second spline joint comprises a ball spline joint comprising a plurality of balls which can roll to permit translation of the pinion gear along the drive axis relative to the drive shaft.

The crowned spline joint may comprise a plurality of fixed crowned splines or teeth, or it may comprise a plurality of ball splines. Each ball spline is formed by a respective line of balls, and each line of balls is received in a respective crowned groove. In another embodiment the crowned spline joint comprises a plurality of crowned splines, each crowned spline comprising a crowned roller.

Optionally the crowned spline joint comprises a spherical bearing which is arranged to permit tilting of the pinion gear relative to the drive axis.

Typically the crowned spline joint comprises a plurality of splines (for instance fixed teeth, balls or rollers) received within a corresponding plurality of grooves; each spline has an opposed pair of sides, an opposed pair of ends, and a top which runs along a length of the spline between its opposed pair of ends and provides an outer diameter of the spline; and each spline is crowned along the length of the spline so that the outer diameter of the spline reaches a maximum outer diameter at or near its centre and gradually decreases either side of the maximum outer diameter towards its opposed ends.

In some embodiments the crowned spline joint comprises a plurality of splines received within a corresponding plurality of grooves; each spline has an opposed pair of sides, an opposed pair of ends, and a top which runs along a length of the spline between its opposed pair of ends; and each spline is crowned along the length of the spline so that a thickness of the spline between its opposed pair of sides reaches a maximum thickness at or near its centre and gradually decreases either side of the maximum thickness towards its opposed ends.

A further aspect of the invention provides a drive system for an aircraft landing gear, the drive system comprising: a pinion gear; a drive shaft arranged to rotate the pinion gear about a drive axis; a driven gear arranged to mesh with the pinion gear to be rotatable by the pinion gear, the driven gear being connectable to a wheel of the landing gear to be capable of rotating the wheel about a wheel axis; a first spline joint between the drive shaft and the pinion gear arranged to permit tilting of the pinion gear relative to the drive axis; and a second spline joint between the drive shaft, and the pinion gear arranged to permit translation of the pinion gear along the drive axis relative to the drive shaft.

The first spline joint may comprise a crowned spline joint, a ball joint, a roller joint, or any other kind of joint which is arranged to permit tilting of the pinion gear relative to the drive axis.

The second spline joint may comprise a ball spline joint, a spline joint with fixed teeth which slide with respect to each other, or any other kind of joint which is arranged to permit the axial translation of the pinion gear.

Preferably the drive system further comprising a coupling member between the drive shaft and the pinion gear, wherein the coupling member is arranged to transmit torque from the drive shaft to the pinion gear via the first and second spline joints.

The coupling member is preferably arranged to transmit the torque to the pinion gear via the first spline joint and to receive the torque from the drive shaft via the second spline joint.

A further aspect of the invention provides a drive system for an aircraft landing gear, the drive system comprising: a pinion gear; a drive shaft arranged to rotate the pinion gear about a drive axis; a driven gear arranged to mesh with the pinion gear to be rotatable by the pinion gear, the driven gear being connectable to a wheel of the landing gear to be capable of rotating the wheel about a wheel axis; and a flexible interface between the drive shaft and the pillion gear, the flexible interface comprising a ball or roller joint with a plurality of pairs of face-to-face grooves distributed around the drive axis, and a plurality of balls or rollers, each pair of face-to-face grooves containing one or more of the balls or rollers, wherein the balls or rollers are arranged to transmit torque between the drive shaft and the pinion gear and to permit tilting of the pinion gear relative to the drive axis.

In one embodiment the flexible interface comprises a ball joint with a plurality of pairs of face-to-face grooves distributed around the drive axis; and a plurality of balls, Each pair of face-to-face grooves contains one or more of the balls, and the balls are arranged to transmit torque between the drive shaft and the pinion gear and to permit tilting of the pinion gear relative to the drive axis. Each pair of face-to-face grooves may contain a single ball only, but more preferably each pair contains three or more of the balls arranged in a line. In this case each groove is preferably curved along its length so that the radial distance of the balls from the drive axis varies along the line of balls reaching a maximum at or near a centre of the line and decreasing either side of the maximum. Each pair of grooves may have a constant width, but more typically one groove in each pair of grooves has a crowned pair of sides, so its width tapers along its length reaching a minimum at or near a centre of the groove and increasing either side of the minimum.

In another embodiment the flexible interface comprises a roller joint with a plurality of pairs of face-to-face grooves distributed around the drive axis; and a plurality of rollers, wherein each pair of face-to-face grooves contains one or more of the rollers, each roller has a roller axis around which the roller can rotate, and each roller is crowned along its roller axis to permit tilting of the pinion gear relative to the drive axis. Typically each pair of grooves contains only a single roller. The grooves may be crowned or straight.

BRIEF DESCRIPTION OF THE DRAWINGS

Embodiments of the invention will now be described with reference to the accompanying drawings, in which:

FIG. 1A shows wheel axle deflection due to vertical loads due to the aircraft weight; FIG. 1B shows wheel axle deflection due to (horizontal) braking loads.

DETAILED DESCRIPTION OF EMBODIMENT(S)

Figure 1A:
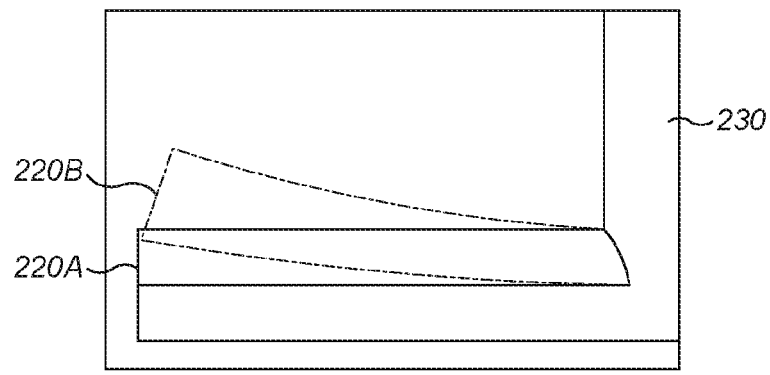
FIGS. 1A, 1B and IC illustrate three modes of deformation experienced by landing gear during use.
Figure 1B:
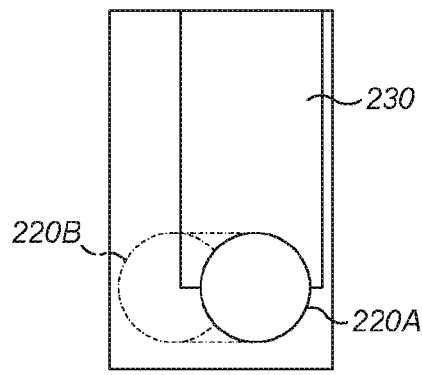
Figure 1C:
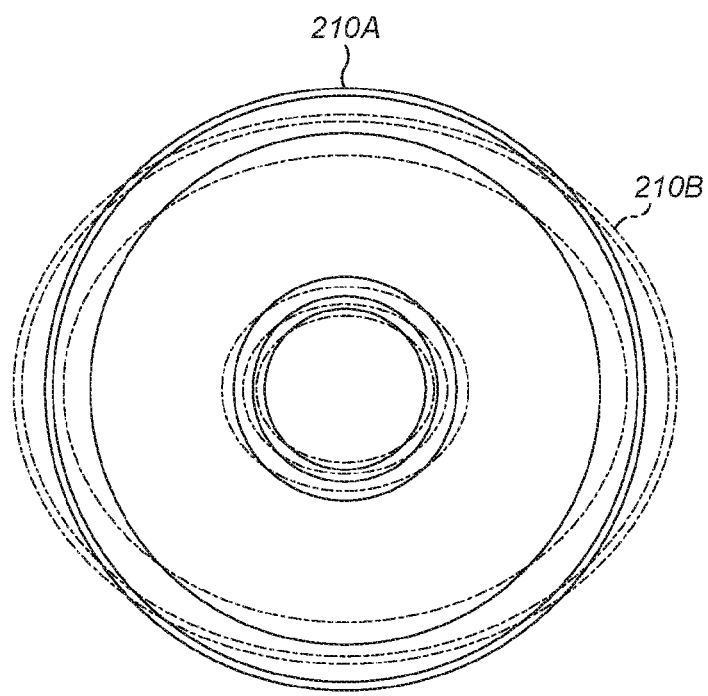
FIG. 1C shows wheel rim deformation due to tyre loads.

An aircraft landing gear experiences many different modes of deformation during use. In particular, each wheel axle 220 is deflected relative to the landing gear leg 230 as a result of the vertical loads due to the weight of the aircraft (FIG. 1A; 220A indicates the wheel axle before deflection, and 220B indicates it after deflection) and the horizontal loads applied during braking (FIG. 1B; 220A indicates the wheel axle before deflection, and 220B indicates it after deflection). In addition, the shape of each wheel rim 210 is deformed (to a lozenge, or oval, shape) due to tyre loads (FIG. 1C; 210A indicates the wheel rim before deflection, and 210B indicates it after deflection). Each deformation mode typically provides deformation within the range of +/−10 mm at the extremities of the wheel. For example, the vertical height of the wheel may be reduced by 10 nm as a result of wheel distortion by tyre loads, and the wheel may tilt through about 2-3 degrees as a result of axle bending caused by vertical aircraft loads, resulting in a displacement of about 10 mm at the periphery of the wheel rim.

Figure 2:
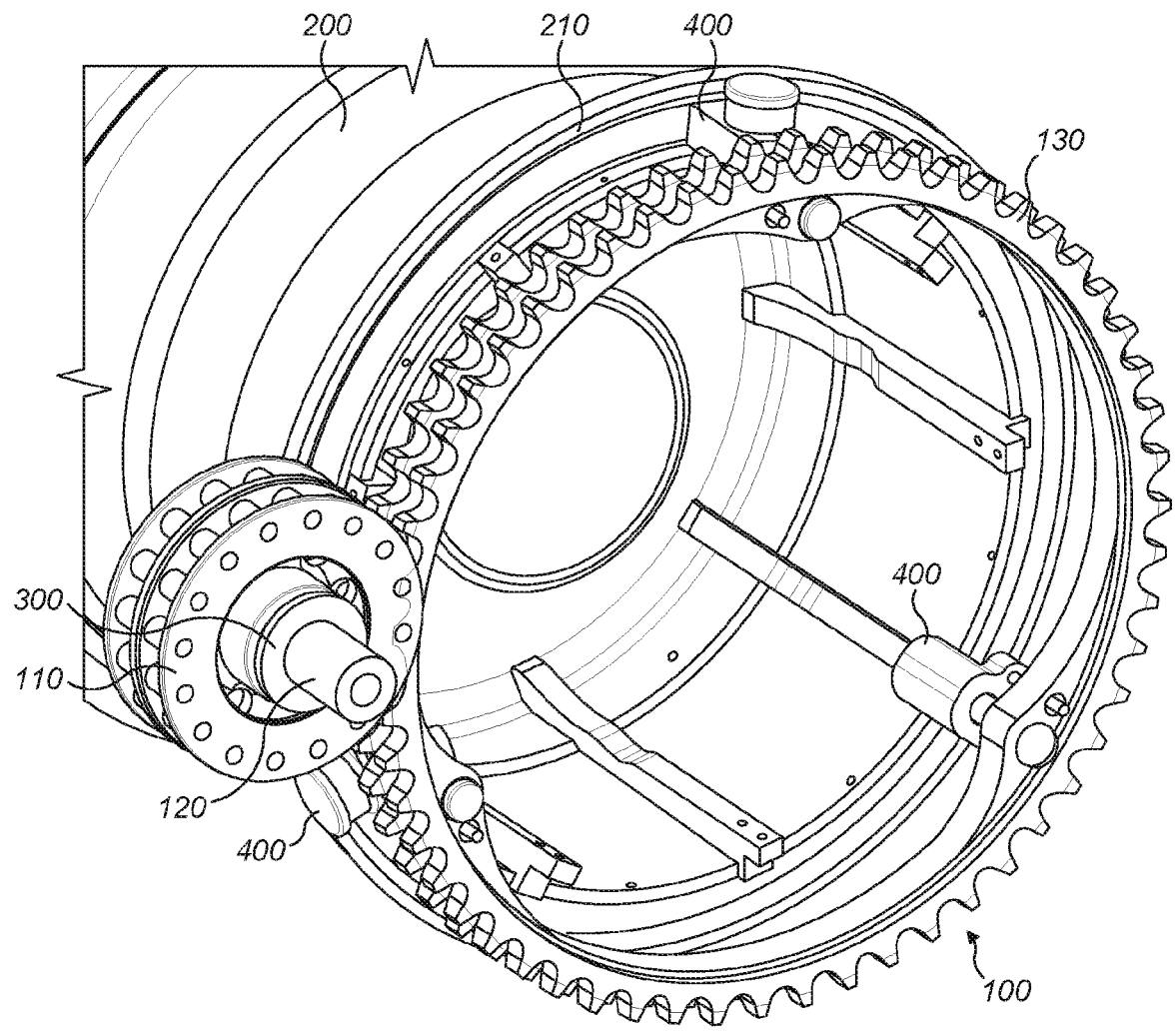
FIG. 2 shows a drive system according to an embodiment of the present invention, with the motor and various features of the landing gear omitted for clarity.
Figure 3:
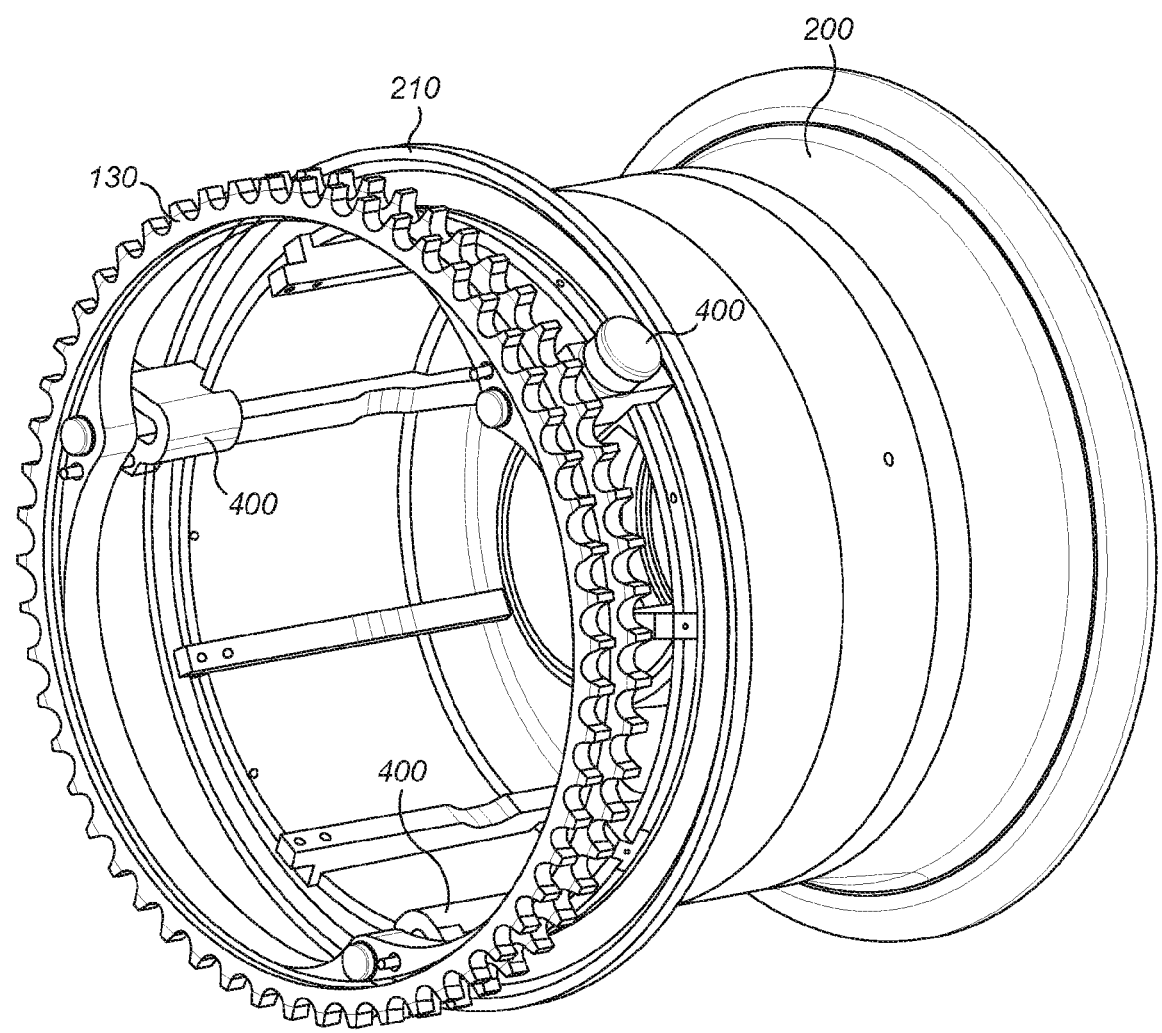
FIG. 3 shows the embodiment of FIG. 2 with the pinion gear omitted.
Figure 4:
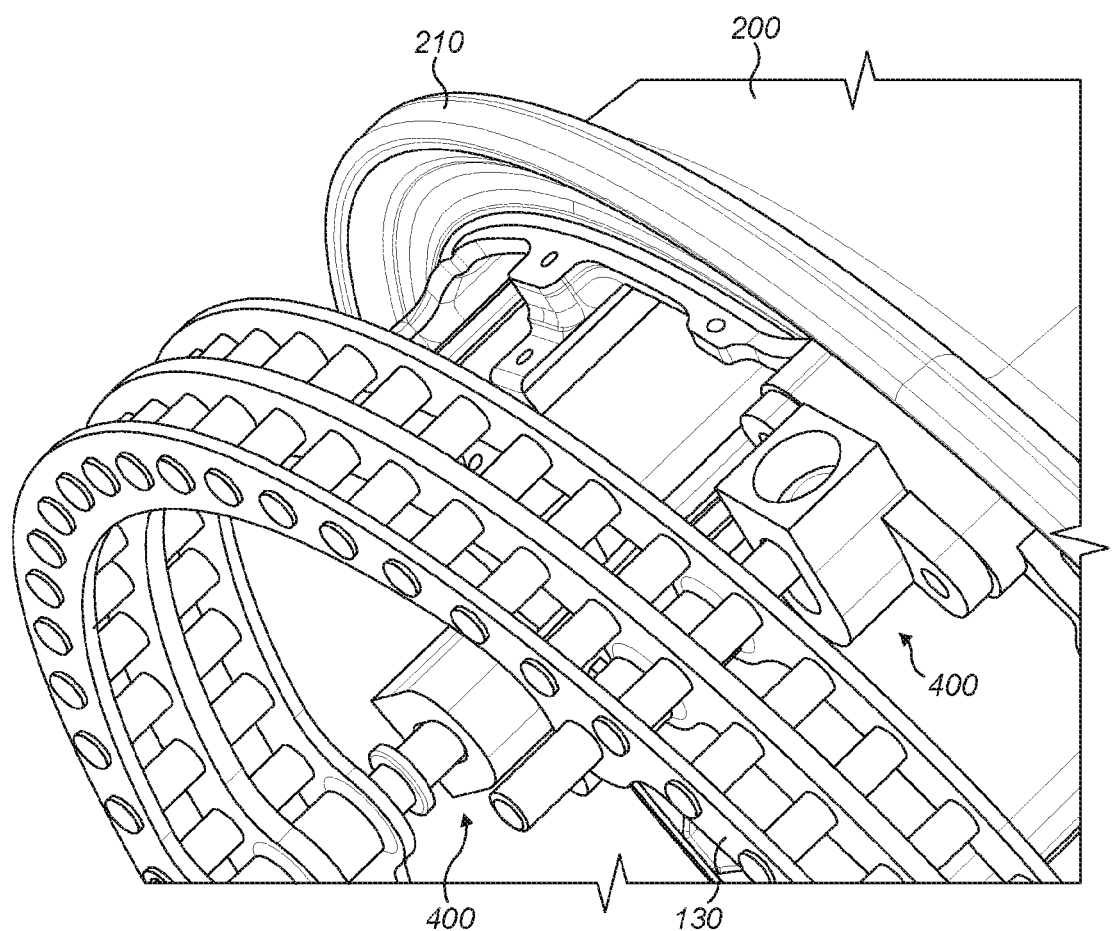
FIG. 4 shows a detail view of the embodiment of FIGS. 2 and 3.
Figure 5A:
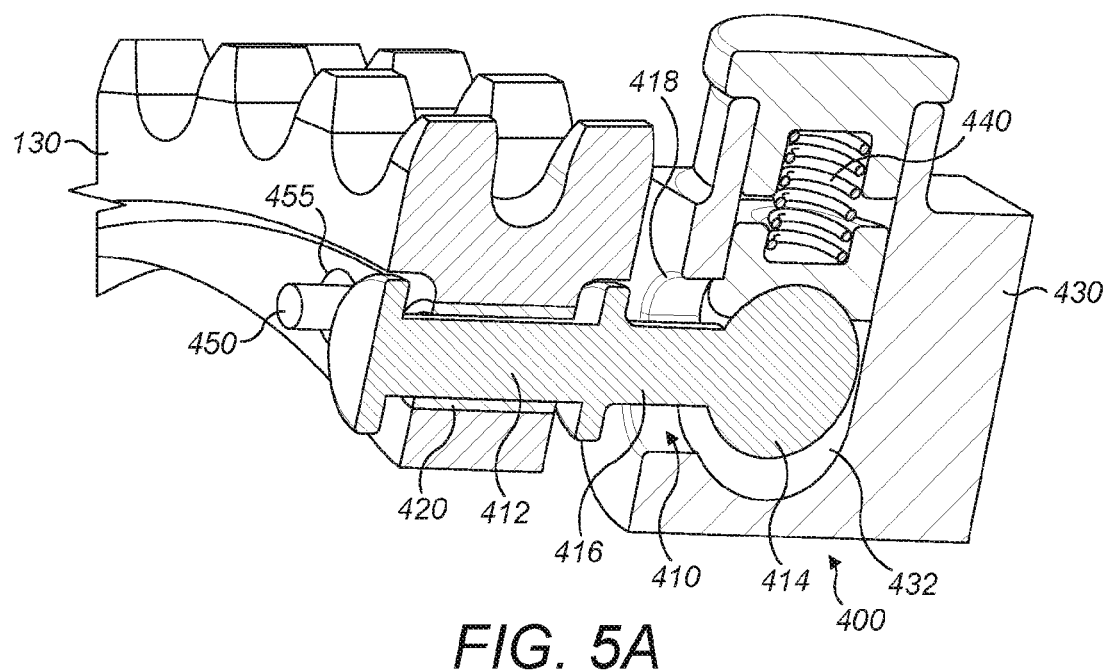
FIGS. 5A and 5B show a driven gear coupling member of a flexible interface according to an embodiment of the invention.
Figure 5B:
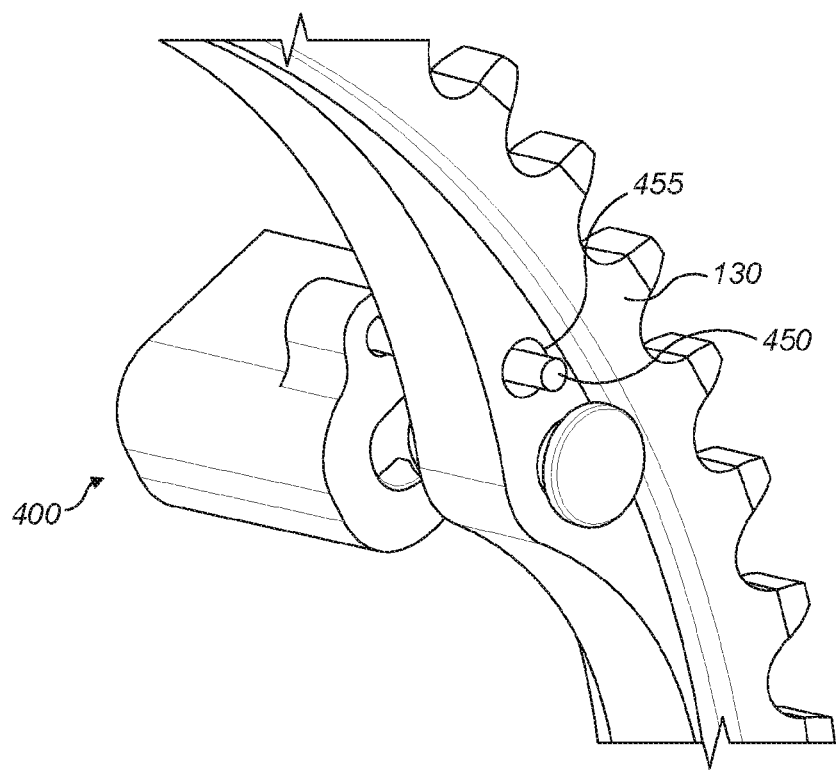

A drive system 100 for autonomous taxiing of an aircraft according to an embodiment of the present invention as shown in FIGS. 2 to 4 is arranged to drive a wheel 200 of the landing gear. The drive system 100 comprises a pinion gear 110 mounted on a drive shaft 120 via a flexible interface comprising a coupling member 300, the drive shaft 120 being driven by an appropriately geared motor (not shown) to rotate about a drive axis. The motor may be arranged to drive only one wheel, or two or more wheels via a differential or similar. Thus, one, some, or all of the wheels of the landing gear may be actively driven by the drive system, and there may be multiple drive systems per landing gear. The pinion gear 110 is meshed with a driven gear 130 which is in the form of an annular rim gear attached to a wheel rim 210 of the wheel 200 via a flexible interface comprising three driven gear coupling members 400 distributed evenly around the wheel rim 210. The driven gear has a larger diameter than the drive pinion. This arrangement provides for a torque-magnifying gear ratio and an efficient use of space.

The deformation modes discussed above can result in misalignment and/or distortion within the drive system 100 since the pinion gear 110 is mounted on the leg or axle (not shown) of the landing gear, while the driven gear 130 is mounted on the wheel 200, which is rotatable about the axle. In the absence of the flexible interface 300, 400, the axle deflections (FIGS. 1A and 1B) can result in a tilt of the driven gear 130 with respect to the pinion gear 110, i.e. the rotational axes of these gears are tilted with respect to one another. Similarly, in the absence of the flexible interface 300, 400, the wheel rim deformation (FIG. 1C) due to tyre loads can result in a translational displacement of the driven gear 130 with respect to the pinion gear 110, i.e. the rotational axes of these gears are displaced with respect to one another. Such wheel rim deformation may also cause undesirable distortion of the driven gear 130. Alternatively, a rigid connection between the driven gear 130 and the wheel 200 may cause further distortion within the wheel rim 210.

The flexible interface 300, 400 serves to isolate the drive system 100 from these deformations.

The driven gear coupling members 400 of the flexible interface each comprise a joint member 410 having a shaft portion 412 which is received within a bushing 420 mounted through a web of the driven gear 130, the shaft portion 412 being capable of both limited translational and rotational movement within the bushing 420 to provide a kinematic cylindrical joint.

The joint member 410 also has a ball portion 414 separated from the shaft portion 412 by a connecting portion 416, the ball portion 414 being received within a socket member 430. The socket member 430 is rigidly connected to the wheel rim 210 and has a socket chamber 432 within which the ball portion 414 is located and a slot opening 416 through which the connecting portion 416 extends and which provides an opening to the socket chamber 43:2. The socket chamber 432 is generally elongate to permit movement of the ball portion 414 of the joint member 410 along a linear path delimited by the extent of the slot opening 416. The ball portion 414 is also able to rotate within the chamber 432. In this way, the ball portion 414 and socket member 430 provide a kinematic ball and socket joint.

Each socket member 430 includes a spring 440 which is arranged to urge the ball portion 414 towards the wheel axis. In this way, the three springs 440 serve to centre the driven gear 130 with respect to the wheel rim 210.

Each socket member 430 also includes a catch finger 450 which is rigidly attached to the socket member 430 and extends therefrom through an oversized through hole 455 through the web of the driven gear 130. The through hole 455 is sized to ensure that there is no contact between the catch linger 450 and the driven gear 130 during normal operation of the drive system 100, but if the joint member 410 of the driven gear coupling member 400 were to break, or the coupling member otherwise fail, the catch 450 would retain the driven gear 130 and maintain a connection with the wheel 200.

Figure 6:
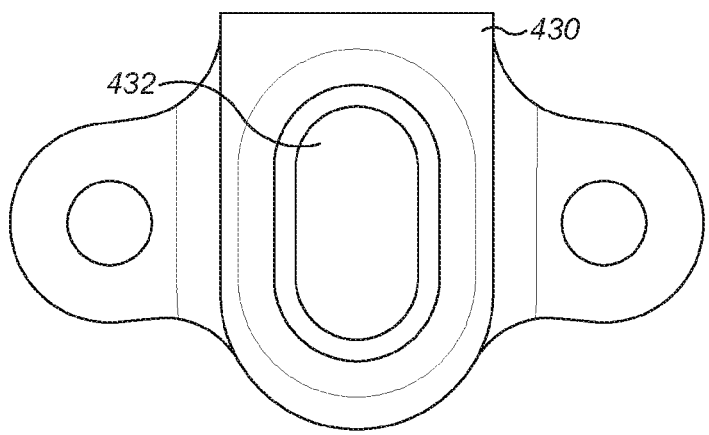
FIGS. 6, 7, 8A and 8B illustrate variations on the ball/cylindrical joint socket of a driven gear coupling member according to an embodiment of the invention.
Figure 7:
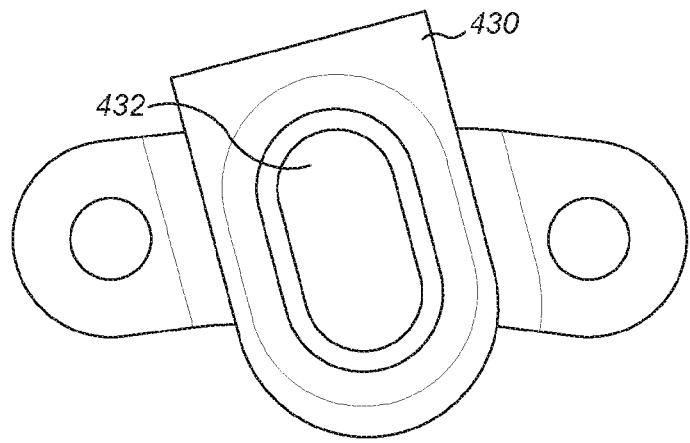
Figure 8A:
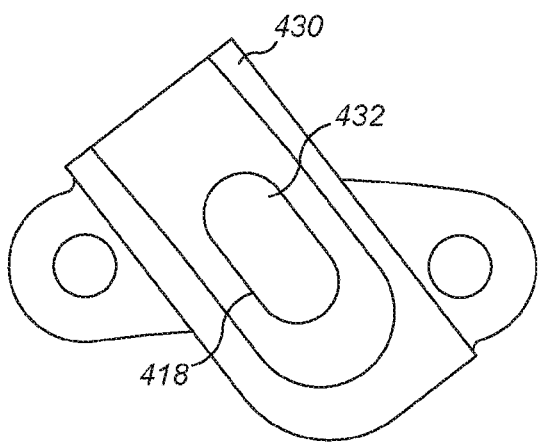
Figure 8B:
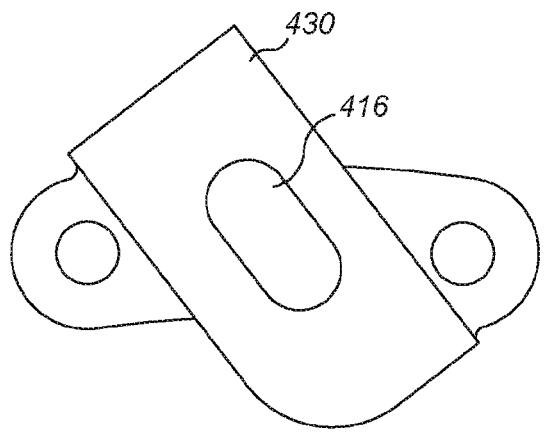

FIGS. 6, 7, 8A and 8B show possible configurations of the socket member 430, the appropriate configuration being selected according to the specific wheel deformation modes to be accommodated. In FIG. 6 the chamber 432 is arranged to provide a straight linear translation of the ball portion 414 in a substantially radial direction of the wheel axis about which the wheel 200 rotates. In FIG. 7 the chamber 432 is arranged to provide a straight linear translation of the ball portion 414 in a direction which is at an angle to the radial direction of the wheel axis. In FIGS. 8A and 8B the chamber is arranged to provide a curved linear translation of the ball portion 414 (the line in FIG. 8A indicating the line of translation) which is at an angle to the radial direction of the wheel axis.

Figure 9A:
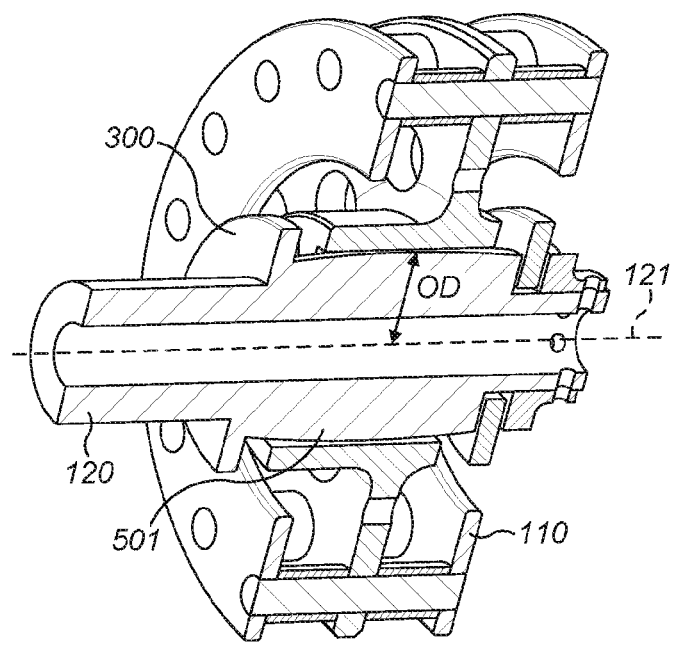
FIGS. 9A, 9B and 9C show a pinion gear coupling of a flexible interface according to an embodiment of the invention.
Figure 9B:
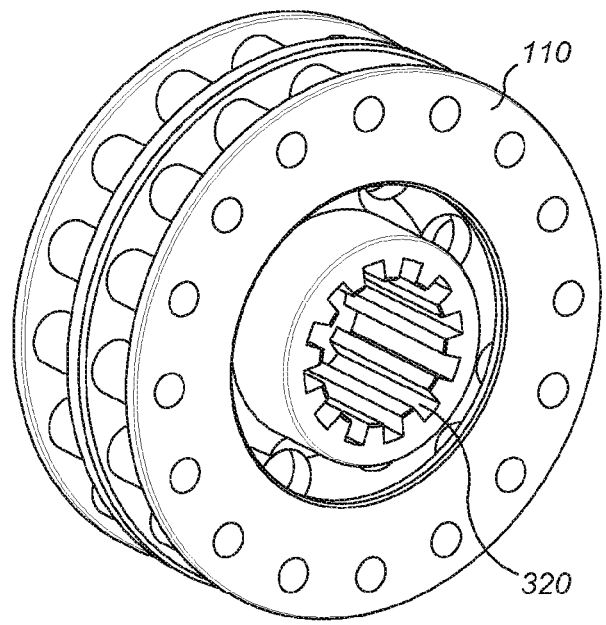
Figure 9C:
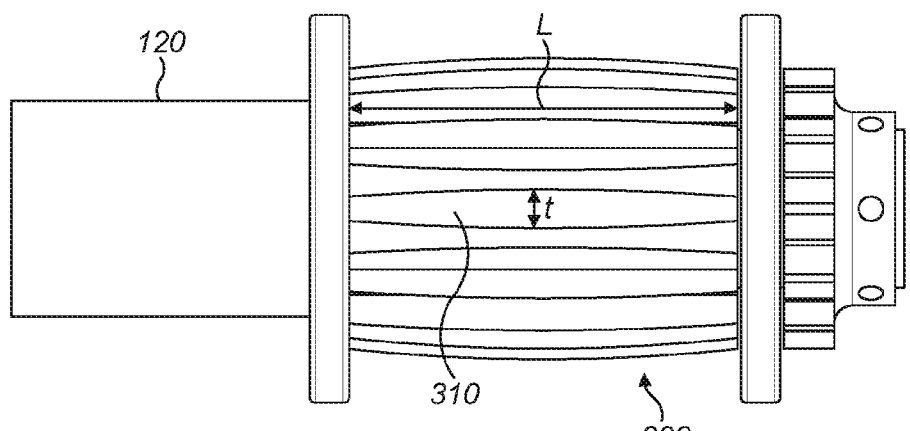

The coupling member 300 shown in FIGS. 9A and 9C provides a flexible interface comprising a crowned spline joint between the drive shaft 120 and the pinion gear 110 to permit tilting of the pinion gear with respect to the rotational axis 121 of the drive shaft. The coupling member 300 includes a plurality of male external splines 310 (and associated female external grooves) which are received within a corresponding plurality of female internal grooves 320 (and associated male internal splines) formed in the pinion gear 110.

Each spline 310 has an opposed pair of sides, an opposed pair of ends, and a top which provides the outer diameter of the spline and runs between the ends and sides of the spline. The spline has a length (labelled "L" in FIG. 9C) between its two ends and a thickness (labelled "t" in FIG. 9C) between its side faces.

The splines 310 are crowned to permit tilting of the pinion gear 110 relative to the drive axis 121 of the drive shaft 120. The splines 310 are crowned in two senses. Firstly, the sides of each spline 310 are crowned (i.e. domed or rounded) along the length of the spline so that the thickness "t" of the spline is at a maximum at or near its centre and gradually decreases to either side reaching a minimum at its opposed ends. The varying thickness of one of the splines can be seen clearly in FIG. 9C, with the maximum thickness at the centre of spline being shown. Secondly, the top of each spline 310 is also crowned (i.e domed or rounded) along the length of the spline so that the outer diameter of the spline (labelled "OD" in FIG. 9A) from the top of the spline to the drive axis 1:21 is at a maximum at its centre and gradually decreases to either side reaching a minimum at its opposed ends. As a result the coupling member 300 as a whole has a barrel shape when viewed from the side as in FIG. 9A.

The female internal grooves 320 (and associated male internal splines) formed in the pinion gear 110 as shown in FIG. 9B are not crowned—in other words they have a thickness and outer diameter which do not vary along the length of the spline.

The curved spline shape described above enables the pinion gear 110 to tilt with respect to the drive shaft 120. The joint may include ball bearings (not shown) within the grooves 320 to facilitate this movement.

In other embodiments the coupling member 300 may be slidably mounted on the drive shaft 120 to permit relative translation between the pinion gear 110 and the drive shaft 120. This relative translation is desirable to accommodate build tolerances, and also enables the pinion to translate to accommodate lateral bending of the wheel rim which can occur during operation of the aircraft. In such embodiments it may not be necessary for the driven gear coupling members 400 to include the shaft portion 412 and the bushing 420, and instead the connecting portion 416 may be rigidly connected to the driven gear 130.

In yet further embodiments the ball portion 414 and socket chamber 432 may be replaced by a shaft portion and bushing (not shown) to provide a kinematic cylindrical joint.

Figure 10:
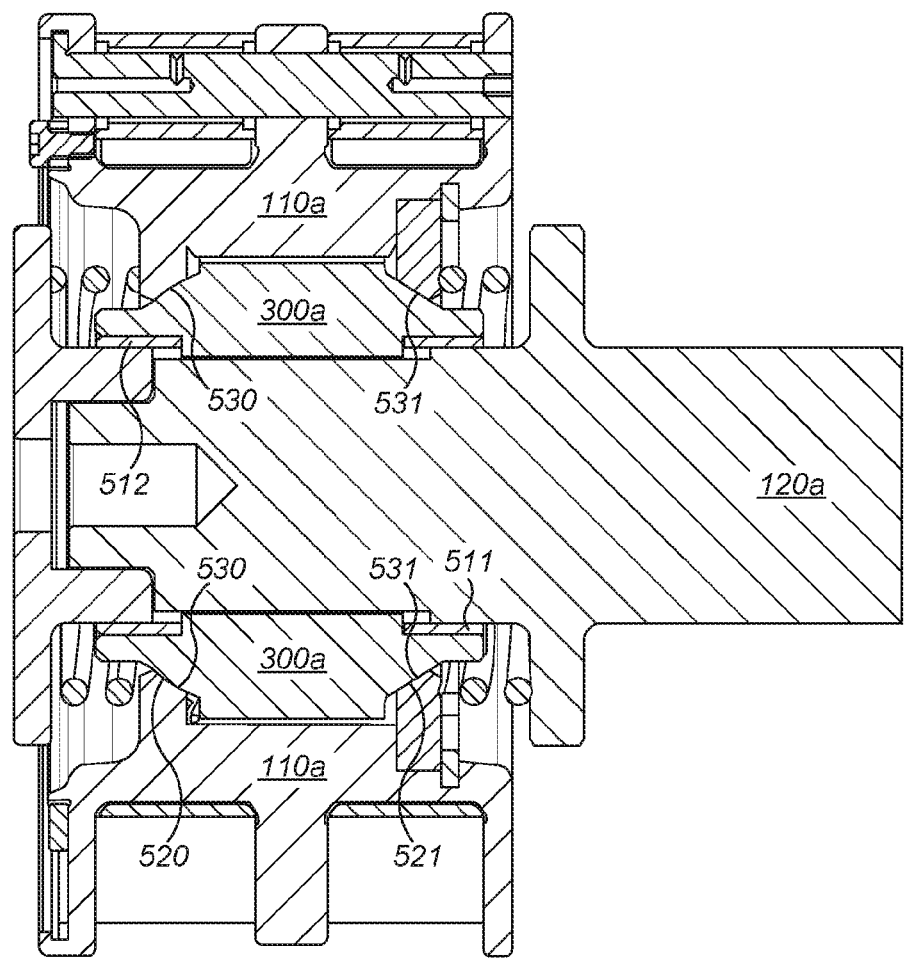
FIG. 10 is a cross-sectional view of a spline joint or a drive system according to another embodiment of the present invention.
Figure 11A:
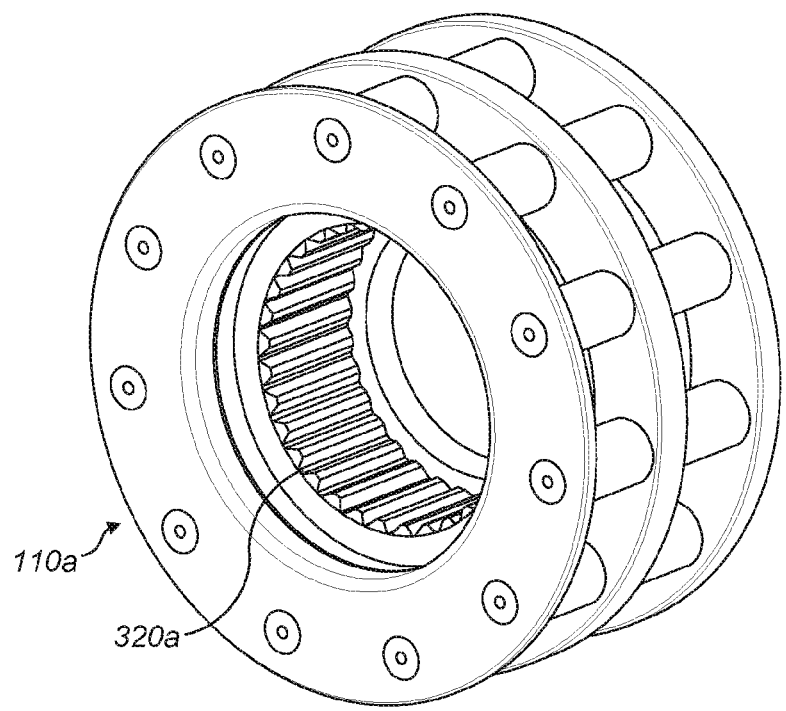
FIG. 11*a* shows a pinion gear of the spline joint of FIG. 10.
Figure 11B:
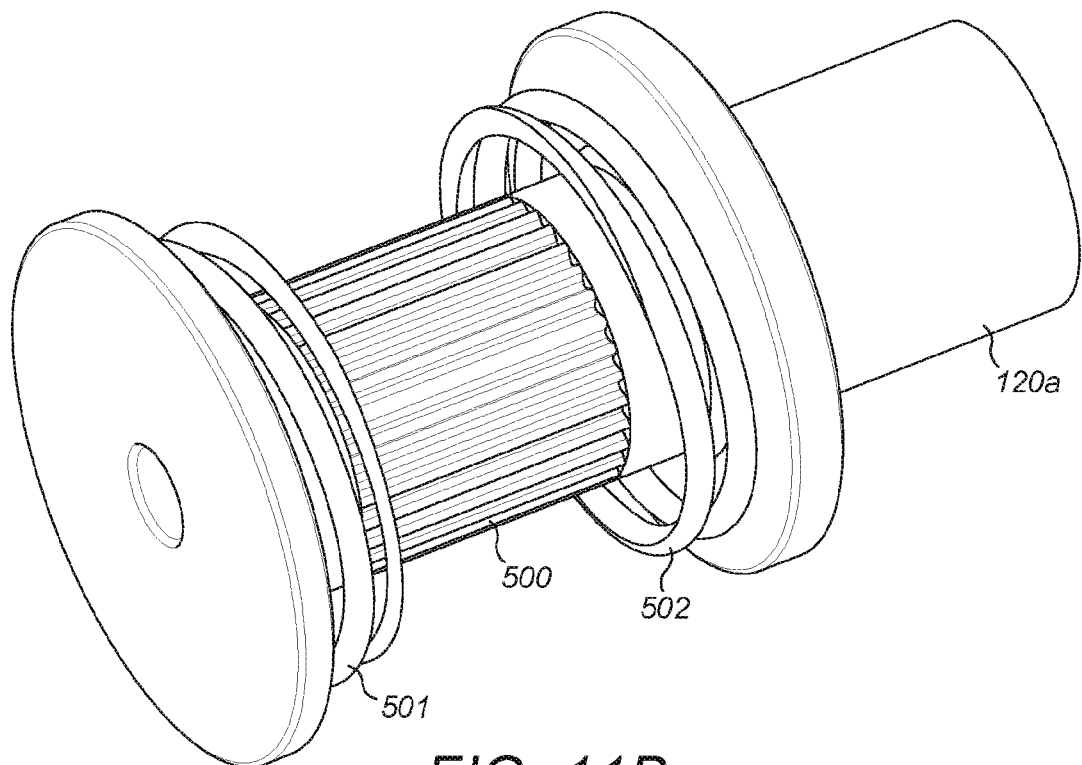
FIG. 11*b* shows a drive shaft of the spline joint of FIG. 10.
Figure 11C:
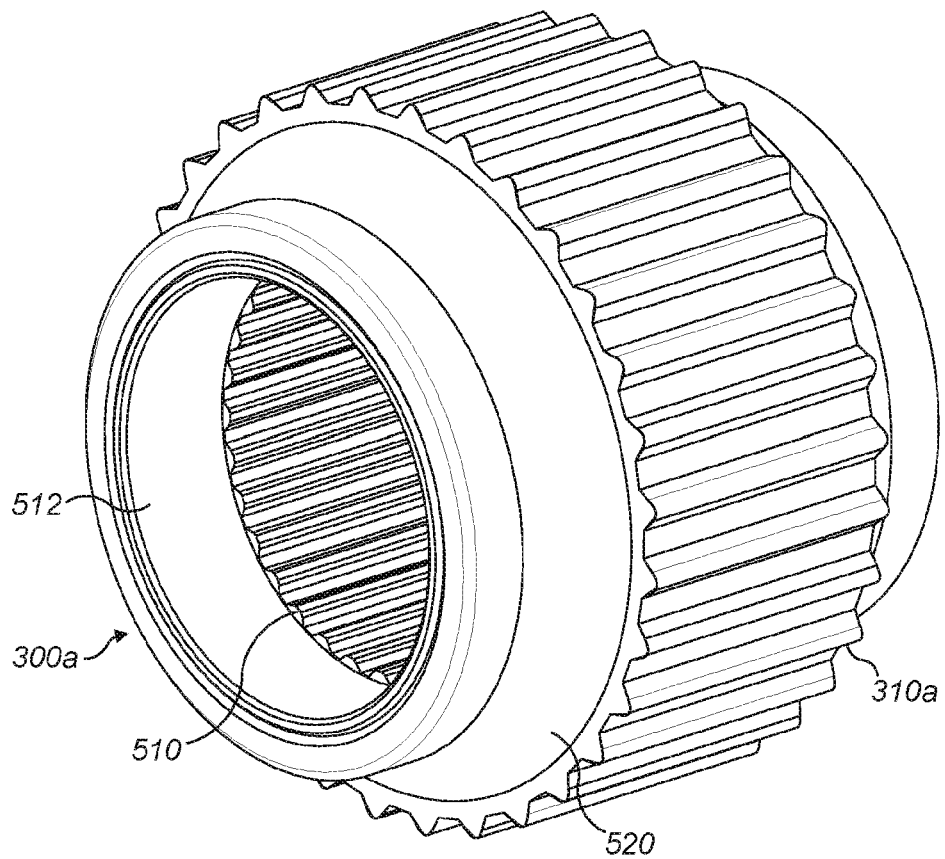
FIG. 11*c* shows a coupling member of the spline joint of FIG. 10.

FIGS. 10-12 show an embodiment in which the coupling member is slidably mounted on the drive shaft to permit relative translation between the pinion gear and the drive shaft. Many of the components in FIGS. 10-12 have equivalents in FIGS. 1-9, and the same reference number will be used (appended by the letter "a") for such components. The drive shaft 120a shown in FIG. 11b has external splines 500 (and associated grooves) between a pair of helical springs 501, 502. The coupling member 300a shown in FIG. 11c has internal splines 510 which mate with the external splines 500 of the drive shaft. The splines 500, 510 are axially straight rather than being crowned. On either side of the internal splines 500 the coupling member 300a carries collars 511, 512 of low friction material (shown in FIG. 10) which provide a low friction sliding bearing enabling the coupling member 300a to slide axially along the drive shaft 120a. The springs 501, 502 provide opposed forces which bias the coupling member 300a (and the pinion gear 110a) towards a central position shown in FIG. 10. Each spring 501, 502 has only 2-3 turns within the space available which may lead to biasing the coupling member 300a at a tilt. To combat this, other spring types may optionally be used, for example a diaphragm spring or petal spring.

The coupling member 300a also has external splines 310a (FIG. 11C) which are crowned as in the previous embodiment.

The external splines 310a (and associated female external grooves) cooperate with a corresponding plurality of female internal grooves 320a (and associated male internal splines) formed in the pinion gear 110a as shown in FIG. 11A. The male internal splines may be straight or they may be crowned like the external splines 310a.

Figure 12A:
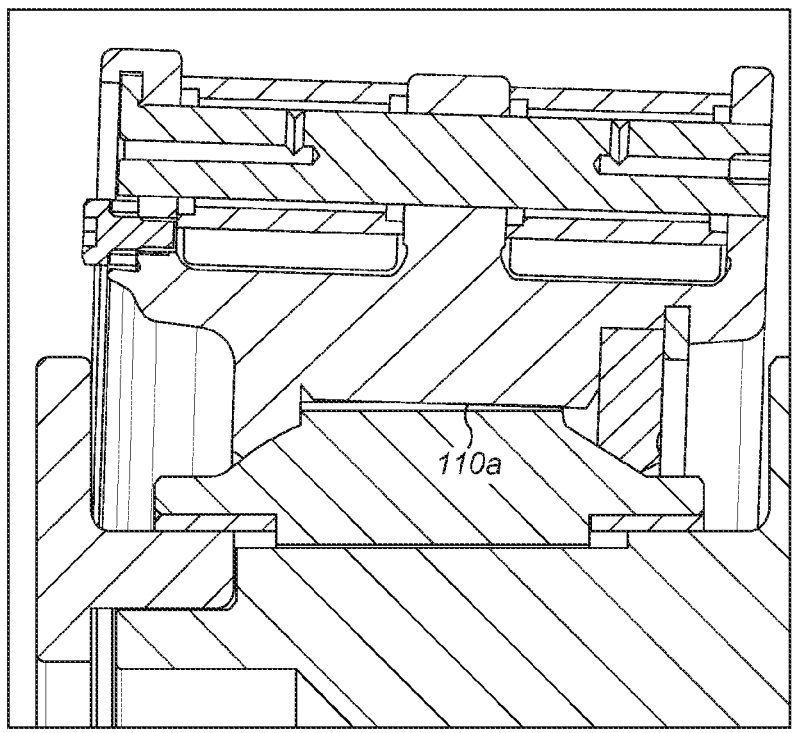
FIG. 12*a* is an enlarged view of part of the spline joint of FIG. 10 showing the pinion gear tilted clockwise.
Figure 12B:
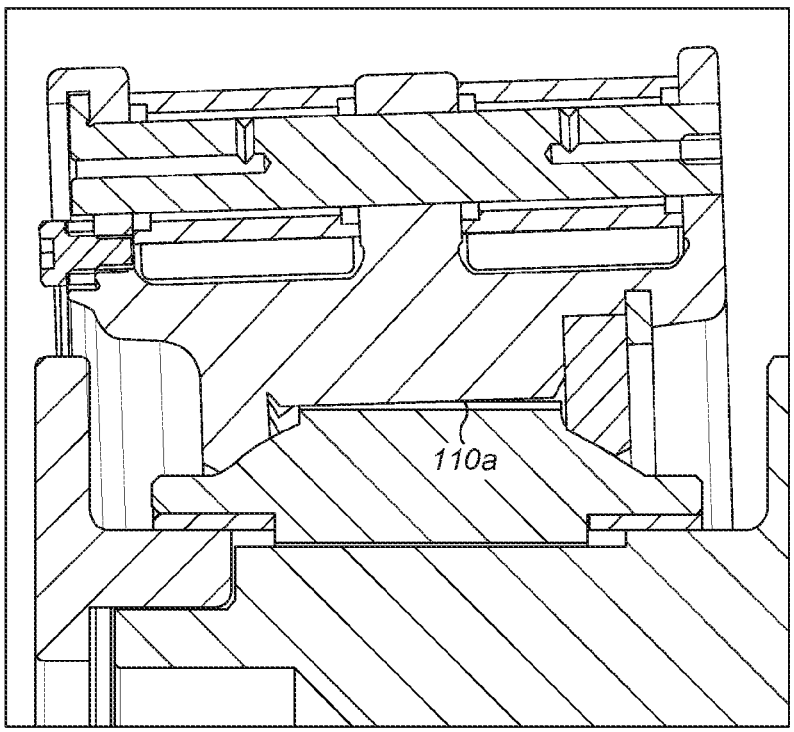
FIG. 12*b* is an enlarged view of part of the spline joint of FIG. 10 showing the pinion gear tilted anti-clockwise.

The coupling member 300a has convex spherical surfaces 520,521 on either side of the crowned external splines 310a. The pinion gear 110a has concave spherical surfaces 530, 531 on either side of the internal splines which bear against the convex spherical surfaces 520,521 of the coupling member 310a as shown in FIG. 10. This spherical bearing enables the pinion gear 110a to tilt with respect to the drive shaft 120a by +/−2.5 deg as shown in FIGS. 12a and 12b. FIG. 12a shows the pinion gear 110a rotated clockwise by 2.5 deg and FIG. 12b shows the pinion gear 110a rotated anti-clockwise by 2.5 deg.

Thus in the embodiment of FIGS. 10-12 the drive shaft 120a is coupled to the pinion gear 110a by a compound or double spline joint: i.e. a spline joint with a first crowned spline joint arranged to permit tilting of the pinion gear relative to the drive axis, and a second un-crowned spline joint arranged to permit translation of the pinion gear along the drive axis relative to the drive shaft. The coupling member 300a is arranged to transmit torque to the pinion gear 100a via the first spline joint and to receive torque from the drive shaft 120a via the second spline joint.

The pinion gear is formed in two parts: a first part with the internal grooves 320a and the spherical concave surface 530, and a second part with the spherical concave surface 531. The second part can be removed to enable the coupling member 300a to be removed.

Figure 13:
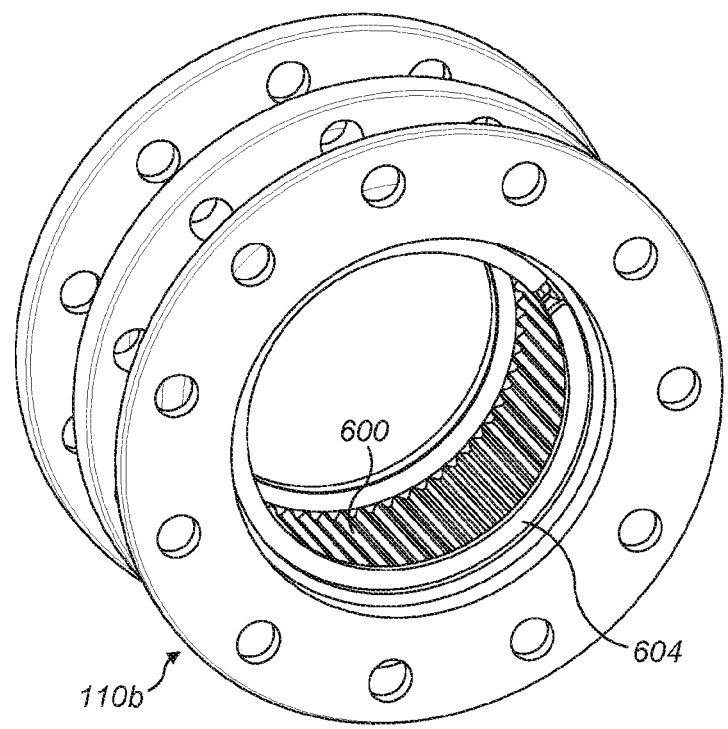
FIGS. 13 and 14 show an alternative pinion gear.
Figure 14:
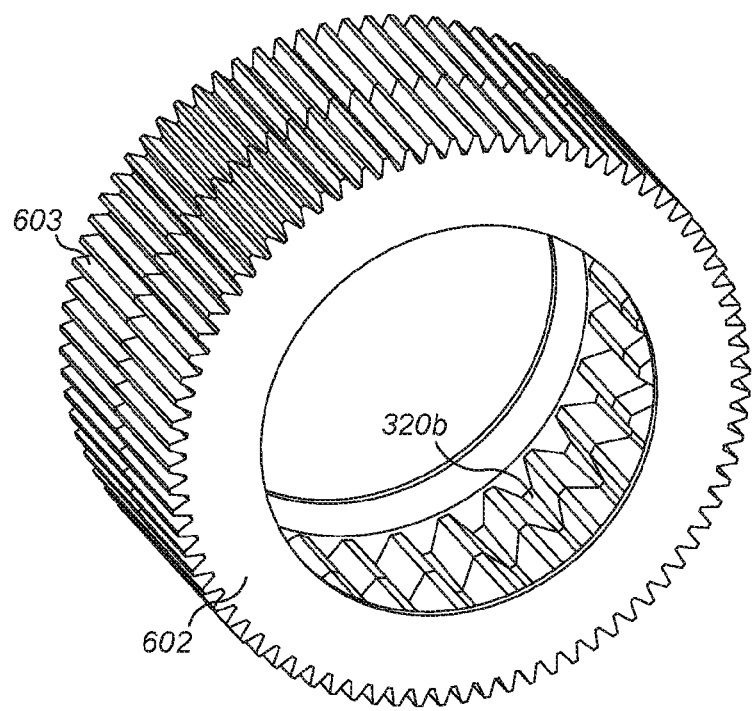
Figure 15:
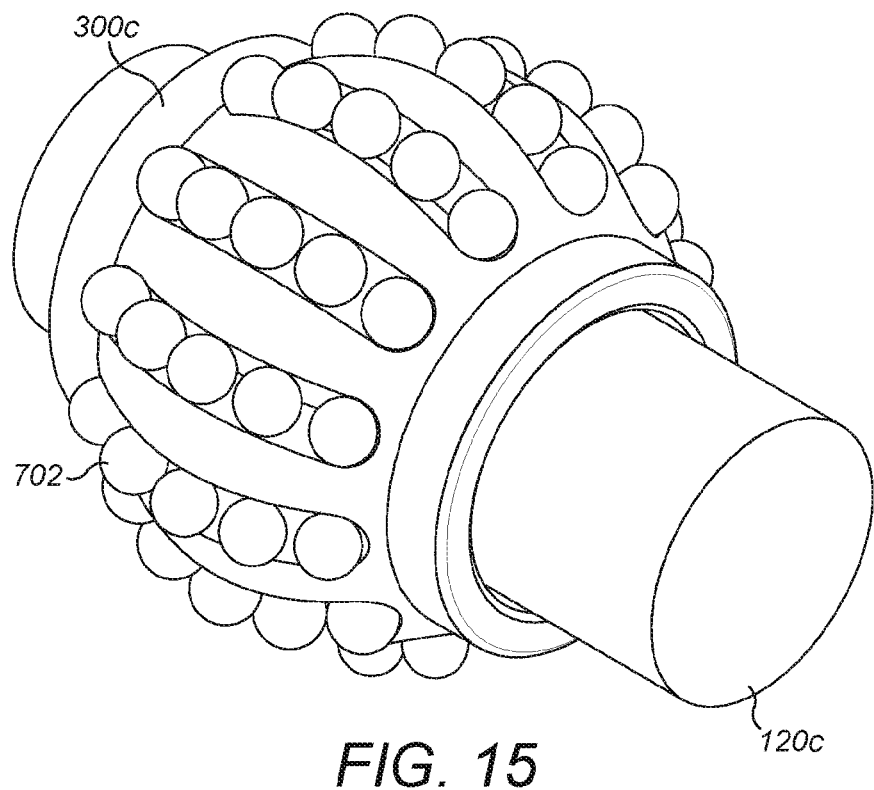
FIGS. 15-20 show a compound spline joint according to a further embodiment of the invention.

FIGS. 13 and 14 show an alternative two-part pinion gear which can be used in the compound spline joint of FIGS. 10-12. Many of the components in FIGS. 13 and 14 have equivalents in FIGS. 10-12, and the same reference number will be used (appended by the letter "b") for such components. A pair of coupling parts 602,603 shown in FIG. 14 are fitted inside the pinion gear 110b and held in place by a circlip 604. The pinion gear 110b is coupled to the two parts 602,603 by a third spline joint which unlike the first and second spline joints in the flexible interface does not permit relative tilting or translation. The pinion gear has internal splines 600 and grooves which couple with external splines and grooves in the parts 602,603 to form this third spline joint. The two parts 602, 603 can be separated to enable the coupling member 300a to be fitted and removed.

FIGS. 15-20 show a compound ball spline joint according to a further embodiment of the invention for use in the drive system of FIGS. 1-8. Many of the components in FIGS. 15-18 have equivalents in FIGS. 1-9, and the same reference number will be used (appended by the letter "c") for such components.

A barrel-shaped coupling member 300c provides a flexible interface between a drive shaft 120c and the pinion gear. Item 704 in FIG. 18 could either be the pinion gear, or a coupling member similar to the parts 60:2, 603 shown in FIG. 14 which can transmit torque from the coupling member 300c to the pinion gear via a third spline joint. The flexible interface comprises a first spline joint between the drive shaft 120c and the pinion gear arranged to permit tilting of the pinion gear relative to the drive axis; and a second spline joint between the drive shaft and the pinion gear arranged to permit translation of the pinion gear along the drive axis relative to the drive shaft.

The first spline joint is provided by a plurality of balls 702 received within crowned external grooves 700 distributed around the drive axis. The grooves 700 are crowned in the sense that the base of the groove is domed or rounded along its length so that the outer diameter of the base of the groove (that is, its distance to the drive axis) is at a maximum at its centre and gradually decreases to either side, reaching a minimum at its opposed ends. This is shown most clearly in FIG. 18b. Each line of five balls 702 forms a respective ball spline. The balls 702 are received in corresponding internal grooves 705 (shown in FIGS. 19 and 20) in the interior of the pinion gear/coupling member 704.

Figure 19:
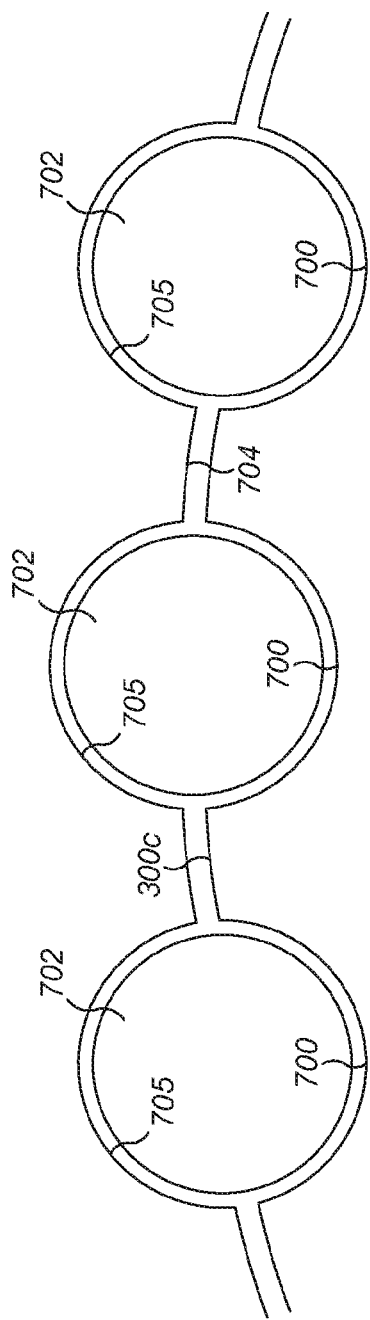
Figure 20:
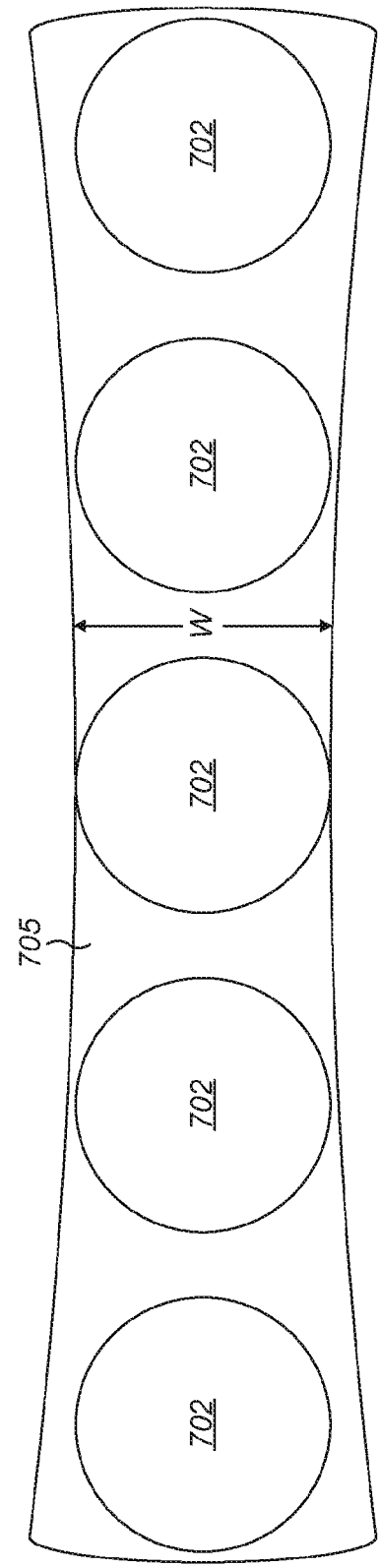

Three pairs of face-to-face grooves 700,705 are shown in cross-section in FIG. 19, which is a cross-section through the centre of these three pairs of grooves and a central one of three associated lines of balls 702. At this point the grooves 700, 705 have the same width. FIG. 20 is a view of one of the internal grooves 705 viewed from the direction of the drive axis. The sides of the groove 705 are crowned along their length so the width W of the groove 705 tapers along its length with a minimum at or near its centre (as in FIG. 19) and increasing either side of the minimum.

The grooves 700, 705 are curved along their length so that the radial distance of the balls 702 from the drive axis varies along the line of balls, reaching a maximum at or near a centre of the line (i.e. at the central ball as shown in FIG. 19) and decreasing either side of the maximum.

Figure 18A:
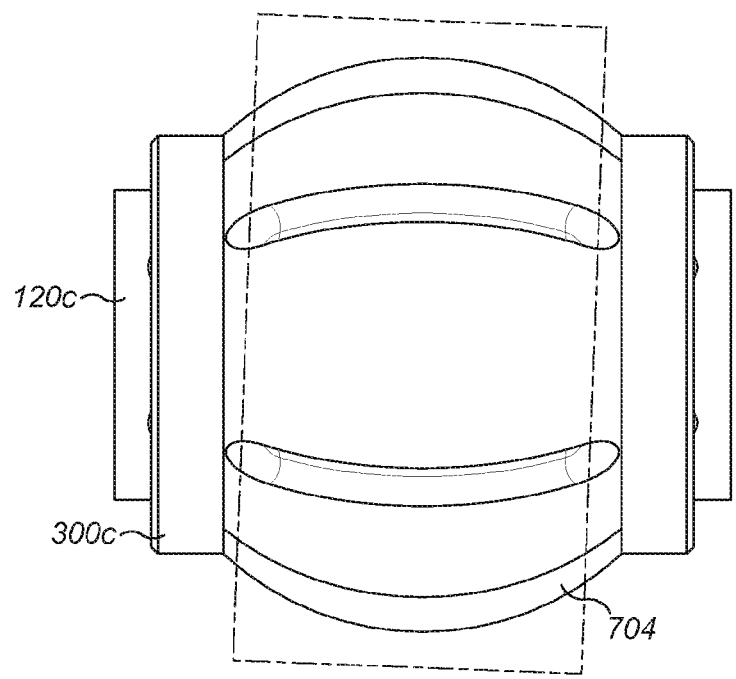
Figure 18B:
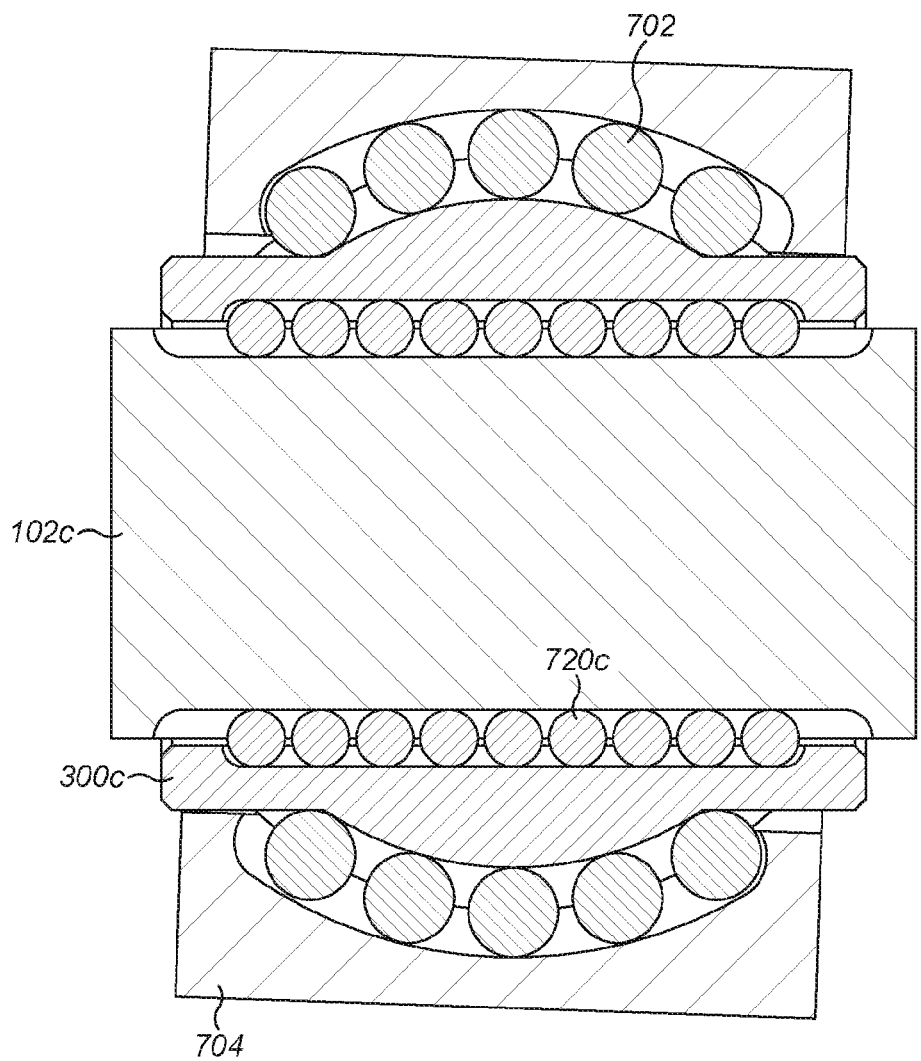

The crowned shape of the grooves means that the outer diameter of each ball spline is also crowned, enabling the pinion gear/coupling member 704 to tilt with respect to the drive shaft 120c. FIGS. 18a and 18b show the pinion gear/coupling member 704 slightly tilted clockwise to illustrate this tilting motion.

Figure 16:
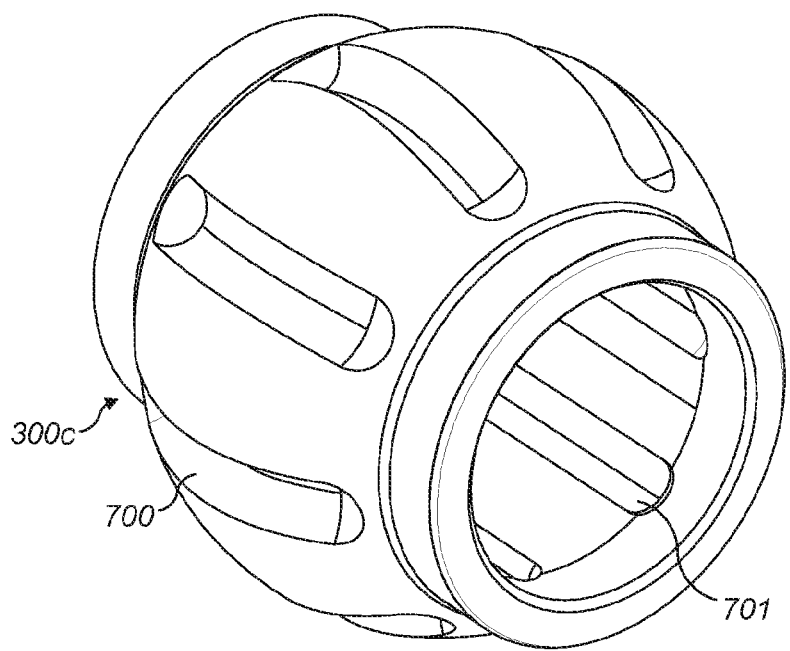
Figure 17:
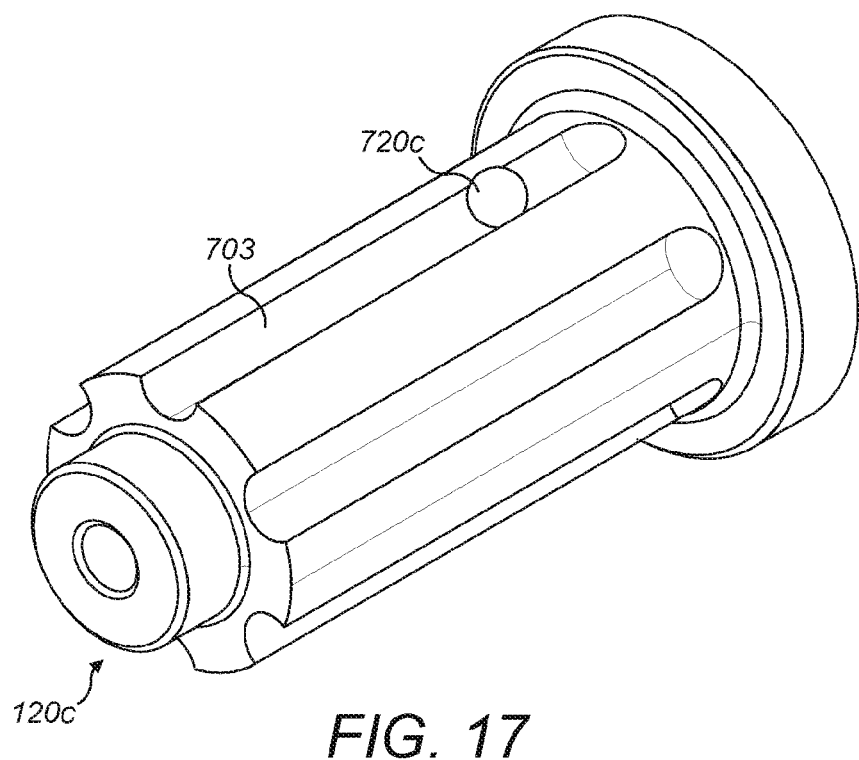

The drive shaft 120c shown in FIG. 17 has straight (un-crowned) external grooves 703 and the coupling member 300c has corresponding straight (un-crowned) internal grooves 701 shown in FIG. 16. The second spline joint is provided by ball bearings 720c seated in the straight grooves 701,703 which provide a set of ball splines between the drive shaft 120c and the coupling member 300c. The ball bearings 720c transmit torque from the drive shaft 120c to the coupling member 300c, but can also roll along the grooves 703 to enable the coupling member 300c to slide axially along the drive shaft 120c. Only one ball bearing 720c is shown in FIG. 17 to make the grooves 703 visible. However it will be appreciated that each groove will be filled with a line of such ball bearings 720c as shown in FIG. 18b, each line of ball bearings 720c providing a respective spline of the second spline joint.

Thus the coupling member 300c is arranged to transmit torque to the pinion gear via the first spline joint (either directly, or via a second coupling member 602, 603 and a third spline joint) and to receive torque from the drive shaft via the second spline joint.

Figure 21:
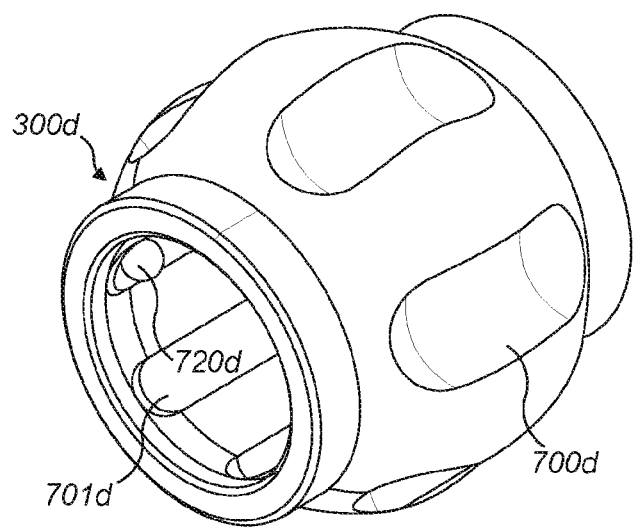
FIGS. 21-23 show a compound spline joint according to a further embodiment of the invention.
Figure 22:
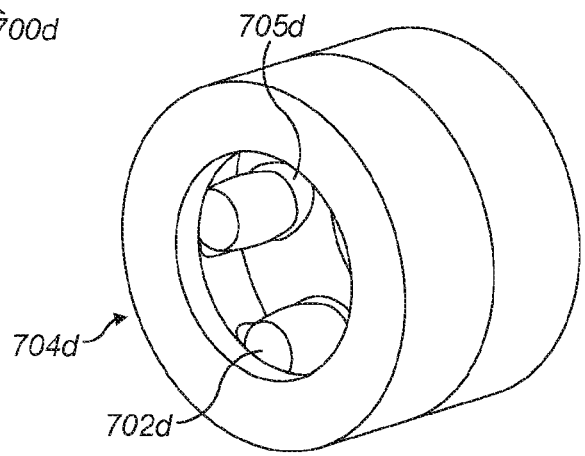
Figure 23:
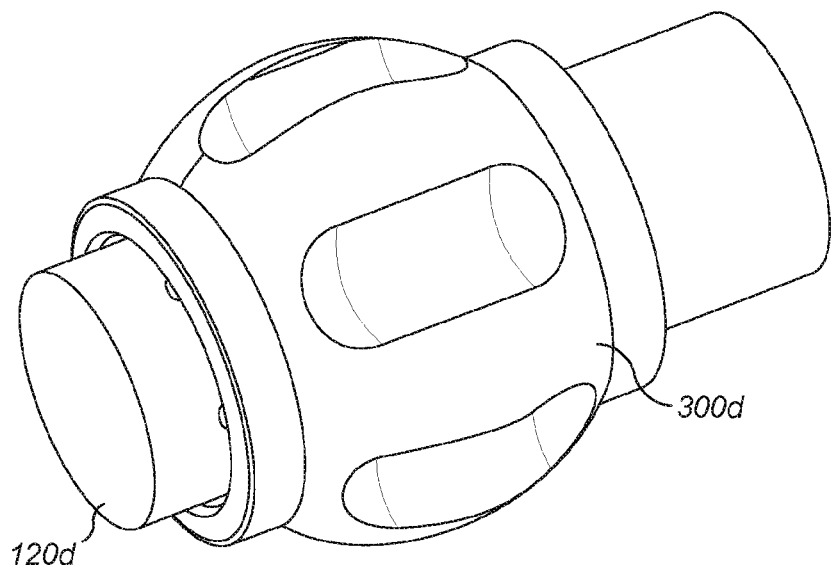

FIGS. 21-23 show the constituent parts of a compound spline joint according to a further embodiment of the invention for use in the drive system of FIGS. 1-8. Many of the components in FIGS. 21-23 have equivalents in FIGS. 15-20, and the same reference number will be used (appended by the letter "d") for such components.

A coupling member 300d provides a flexible interface between a drive shaft 120d and a pinion gear. Item 704d in FIG. 22 is either the pinion gear, or a coupling member similar to the parts 602, 603 shown in FIG. 14 which can transmit torque to the pinion gear via a third spline joint.

A first spline joint is provided by a plurality of rollers 702d received within internal grooves 705d (which may be crowned or straight) in the part 704d. The coupling member 300d has external grooves 700d which are typically crowned in the same manner as the grooves 700 in the previous embodiment (although they may be straight). Each roller 702d forms a respective crowned roller spline which is received in a respective pair of face-to-face grooves 700d, 705d. Each roller 702d is crowned or barrel shaped. That is, each roller has a roller axis around which it can rotate, and each roller is crowned or domed along its roller axis so its outer diameter (that is its side-to-side diameter transverse to the roller axis) is at a maximum at its centre and gradually decreases to either side, reaching a minimum at its opposed ends. This crowned shape of the rollers 702d enables the pinion gear/coupling member 704d to tilt with respect to the drive shaft 120d.

The drive shaft 120d has straight external grooves (not shown) and the coupling member 300d has corresponding straight internal grooves 701d shown in FIG. 21. A second spline joint is provided by ball bearings (one indicated at 720d) seated in the grooves 701d to provide a set of ball splines between the drive shaft 120d and the coupling member 300d. The ball bearings 720d transmit torque from the drive shaft 120d to the coupling member 300d, but can also roll along the grooves in the drive shaft to enable the coupling member 300d to slide axially along the drive shaft 120d. A ball bearing 720d is only shown in one of grooves 701d in the drawing to make the other grooves visible.

Thus the coupling member 300d is arranged to transmit torque to the pinion gear via the first spline joint (either directly, or via a second coupling member 602, 603 and a third spline joint) and to receive torque from the drive shaft via the second spline joint.

Figure 24:
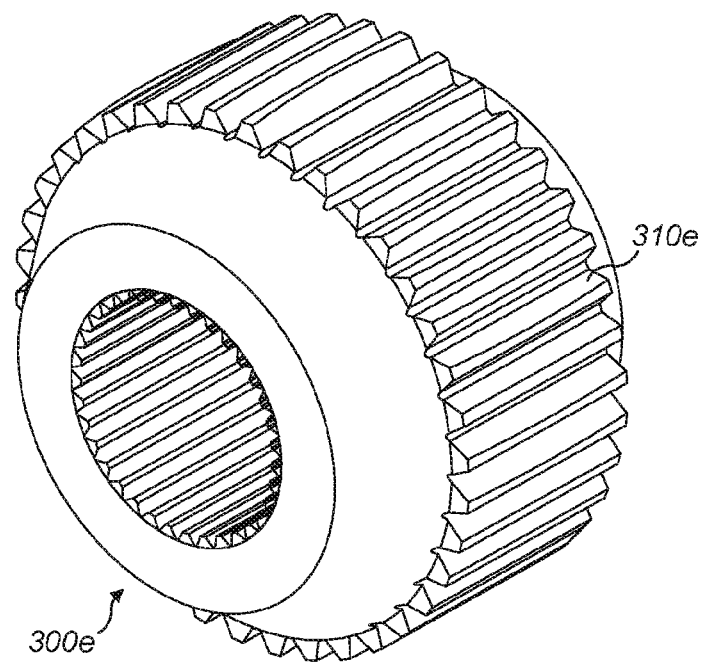
FIG. 24 shows an alternative coupling member.

FIG. 24 shows an alternative coupling member 300e which can be substituted for the coupling member 300a shown in FIG. 11c so that it transmits torque to the pinion gear via the first spline joint and receives torque from the drive shaft via the second spline joint. The tops of the external splines 310e are crowned in a similar fashion to the external splines 310a of the coupling member 300a of FIG. 11c. However unlike the splines 310a (which have convex crowned sides) the sides of each spline 310e are concave so that the thickness of the spline is at a minimum at or near its centre and gradually increases to either side reaching a minimum at its opposed ends. The internal teeth (not shown) of the pinion gear which are received in the grooves between the external splines 310e have convex crowned sides like the splines 310a in the previous embodiment.

Figure 25:
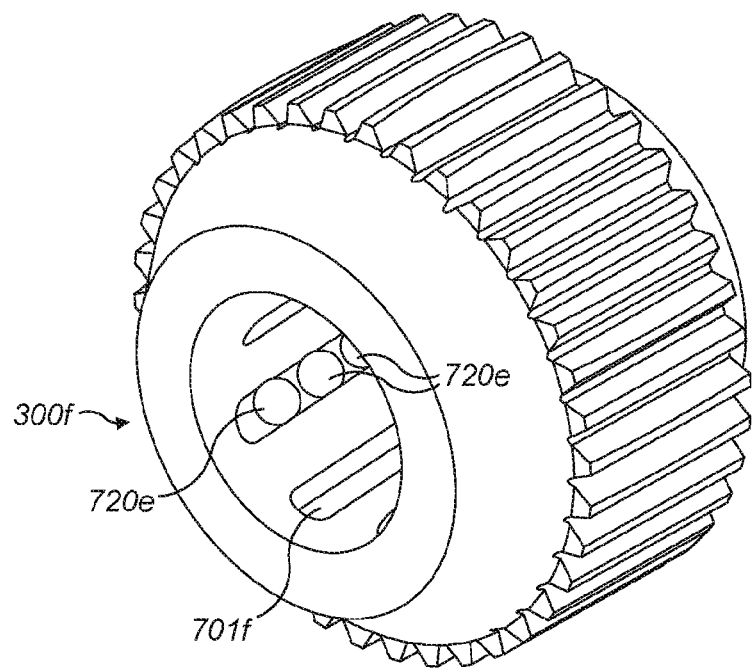
FIG. 25 shows a further alternative coupling member.

FIG. 25 shows a further alternative coupling member 300f which can be substituted for the coupling member 300a shown in FIG. 11c so that it transmits torque to the pinion gear via the first spline joint and receives torque from the drive shaft via the second spline joint. The external splines are similar to the external splines 310e in the embodiment of FIG. 24, but the internal splines are replaced by straight grooves 701f like the grooves 701, 701d in previous embodiments. As with the previous embodiments, the grooves 701e receive lines of ball bearings (one of which is shown at 720e) which transmit torque but permit axial translation. Ball bearings 720e are not shown in the other grooves 701f in the drawing to make these grooves visible.

In the illustrated embodiments the pinion gear and driven gear comprise a roller gear (pin gear) or sprocket, respectively. In other embodiments the pinion gear may comprise a sprocket and the driven gear may comprise a roller gear. A roller gear comprises a series of rollers formed by two rigid annular rings connected together by a series of rollers arranged in a ring to form a continuous track. The rollers are each rotatable about a pin which extends between the annular rings to form a rigid connection between the annular rings. In the illustrated embodiments the roller gear is shown as having two adjacent rows of rollers; in other embodiments only a single row of rollers may be necessary.

A key advantage of achieving the motor-wheel connection via a sprocket and roller gear is that such a mechanism is inherently robust and tolerant of environmental contamination. Thus, it may not be necessary to enclose the drive system within a casing to prevent ingress of debris and other contaminants. In contrast, drive system arrangements employing meshing toothed gears, must be suitably protected from contaminants, the required protective casing adding both weight and expense, and making routine inspection difficult.

Another advantage of the sprocket-roller arrangement is that it is more tolerant of wheel deformation and misalignment between pinion and driven gear than meshing toothed gear arrangements.

In other embodiments the roller gear may be replaced by a roller chain (also known as an attachment chain, or attachment roller chain) extending around an outer circumference of a support member and being fixed thereto.

In yet further embodiments the driven gear and pinion gear may comprise toothed gears of the type usually used in drive transmissions.

Although the invention has been described above with reference to one or more preferred embodiments, it will be appreciated that various changes or modifications may be made without departing from the scope of the invention as defined in the appended claims.

The invention claimed is:

1. A drive system for an aircraft landing gear, the drive system comprising:
    a pinion gear;
    a drive shaft arranged to rotate the pinion gear about a drive axis;
    a driven gear arranged to mesh with the pinion gear to be rotatable by the pinion gear, the driven gear being connectable to a wheel of the landing gear to be capable of rotating the wheel about a wheel axis; and
    a flexible interface comprising a crowned spline joint having an outer diameter which varies along the length of the spline, wherein the crowned spline joint is between the drive shaft and the pinion gear to permit tilting of the pinion gear relative to the drive axis,
    wherein the pinion gear is slidably mounted on the drive shaft via a coupling member to permit translation of the pinion gear relative to the drive shaft along the rotation axis of the drive shaft.

2. A drive system according to claim 1, wherein the coupling member comprises the crowned spline joint arranged to permit translation of the pinion gear along the drive axis.

3. A drive system according to claim 2, wherein the crowned spline joint is slidably mounted on the drive shaft to permit relative translation between the pinion gear and the drive shaft.

4. A drive system according to claim 3, wherein the crowned spline joint is slidably mounted on the drive shaft to permit relative translation between the pinion gear and the drive shaft along the drive axis.

5. A drive system according to claim 1, wherein the flexible interface is arranged to permit relative translation between the pinion gear and the drive shaft along the drive axis.

6. A drive system according to claim 1, wherein the crowned spline joint comprises a plurality of ball splines each formed by a respective line of balls, and each line of balls is received in a respective crowned groove.

7. A drive system according to claim 1, wherein the crowned spline joint comprises a plurality of crowned splines, and each crowned spline comprises a crowned roller.

8. A drive system according to claim 1, wherein the crowned spline joint comprises a spherical bearing which is arranged to permit tilting of the pinion gear relative to the drive axis.

9. A drive system according to claim 1, wherein the crowned spline joint comprises a plurality of splines received within a corresponding plurality of grooves; each spline has an opposed pair of sides, an opposed pair of ends, and a top which runs along a length of the spline between its opposed pair of ends and provides an outer diameter of the spline; and each spline is crowned along the length of the spline so that the outer diameter of the spline reaches a maximum outer diameter at or near its center and gradually decreases either side of the maximum outer diameter towards its opposed ends.

10. An aircraft landing gear comprising a landing gear wheel; and a drive system according to claim 1 with its driven gear connected to the landing gear wheel.

11. A drive system for an aircraft landing gear, the drive system comprising:
    a pinion gear;
    a drive shaft arranged to rotate the pinion gear about a drive axis;
    a driven gear arranged to mesh with the pinion gear to be rotatable by the pinion gear, the driven gear being connectable to a wheel of the landing gear to be capable of rotating the wheel about a wheel axis;
    a flexible interface comprising a spline joint, wherein the spline joint is between the drive shaft and the pinion gear to permit tilting of the pinion gear relative to the drive axis, and,
    wherein the flexible interface further comprises a second spline joint arranged to permit translation of the pinion gear along the rotation axis of the drive shaft relative to the drive shaft.

12. A drive system according to claim 11, wherein the second spline joint comprises a plurality of splines received within a corresponding plurality of grooves, and the splines can move along the grooves (or vice versa) to permit translation of the pinion gear along the drive axis relative to the drive shaft.

13. A drive system according to claim 11, wherein the crowned spline joint comprises a plurality of external splines received within a corresponding plurality of internal grooves in the pinion gear, the internal grooves can tilt relative to the external splines to permit tilting of the pinion gear relative to the drive axis, the second spline joint comprises a plurality of internal splines received within a corresponding plurality of external grooves in the drive shaft, and the internal splines can move along the external grooves to permit translation of the pinion gear along the drive axis relative to the drive shaft.

14. A drive system according to claim 13, wherein the external splines and internal splines are formed in a single coupling member which transmits torque from the drive shaft to the pinion gear.

15. A drive system according to claim 14, wherein the coupling member is arranged to transmit torque from the drive shaft to the pinion gear via the crowned spline joint and the second spline joint.

16. A drive system according to claim 15 wherein the coupling member is arranged to transmit the torque to the pinion gear via the crowned spline joint and to receive the torque from the drive shaft via the second spline joint.

17. A drive system according to claim 11, wherein the second spline joint comprises a ball spline joint.

18. A drive system for an aircraft landing gear, the drive system comprising:
   a pinion gear;
   a drive shaft arranged to rotate the pinion gear about a drive axis;
   a driven gear arranged to mesh with the pinion gear to be rotatable by the pinion gear, the driven gear being connectable to a wheel of the landing gear to be capable of rotating the wheel about a wheel axis;
   a first spline joint between the drive shaft and the pinion gear arranged to permit tilting of the pinion gear relative to the drive axis;
   a second spline joint between the drive shaft and the pinion gear arranged to permit translation of the pinion gear along the drive axis relative to the drive shaft; and,
   wherein the pinion gear is slidably mounted on the drive shaft via a coupling member to permit translation of the pinion gear relative to the drive shaft along the rotation axis of the drive shaft.

19. A drive system according to claim 18, wherein the first spline joint comprises a crowned spline joint, a ball joint or a roller joint.

20. A drive system according to claim 18, wherein the second spline joint comprises a ball spline joint.

21. A drive system according to claim 18, wherein the coupling member is arranged to transmit torque from the drive shaft to the pinion gear via the first and second spline joints.

22. A drive system according to claim 21 wherein the coupling member is arranged to transmit the torque to the pinion gear via the first spline joint and to receive the torque from the drive shaft via the second spline joint.

23. An aircraft landing gear comprising a landing gear wheel; and a drive system according to claim 18 with its driven gear connected to the landing gear wheel.

24. A drive system for an aircraft landing gear, the drive system comprising:
   a pinion gear;
   a drive shaft arranged to rotate the pinion gear about a drive axis;
   a driven gear arranged to mesh with the pinion gear to be rotatable by the pinion gear, the driven gear being connectable to a wheel of the landing gear to be capable of rotating the wheel about a wheel axis; and
   a flexible interface between the drive shaft and the pinion gear,
   wherein the flexible interface comprises a ball joint with a plurality of pairs of face-to-face grooves distributed around the drive axis; and
   wherein each pair of face-to-face grooves contains three or more balls arranged in a line, and each groove is curved along its length so that the radial distance of the balls from the drive axis varies along the line of balls reaching a maximum at or near a center of the line and decreasing either side of the maximum; and,
   wherein the balls are arranged to transmit torque between the drive shaft and the pinion gear and to permit tilting of the pinion gear relative to the drive axis;
   wherein the pinion gear is slidably mounted on the drive shaft via a coupling member to permit translation of the pinion gear relative to the drive shaft along a rotation axis of the drive shaft,
   wherein one groove in each pair of grooves has a width which varies along its length reaching a minimum at or near a center of the groove and increasing either side of the minimum.

25. A drive system according to claim 24, wherein the flexible interface comprises a ball joint with a plurality of pairs of face-to-face grooves distributed around the drive axis; and a plurality of balls, wherein each pair of face-to-face grooves contains one or more of the balls, and the balls are arranged to transmit torque between the drive shaft and the pinion gear and to permit tilting of the pinion gear relative to the drive axis.

26. A drive system according to claim 24, wherein the flexible interface comprises a roller joint with a plurality of pairs of face-to-face grooves distributed around the drive axis; and a plurality of rollers, wherein each pair of face-to-face grooves contains one or more of the rollers, each roller has a roller axis around which the roller can rotate, and each roller is crowned along its roller axis to permit tilting of the pinion gear relative to the drive axis.

27. An aircraft landing gear comprising a landing gear wheel; and a drive system according to claim 24 with its driven gear connected to the landing gear wheel.

* * * * *